(12) United States Patent
Okuyama et al.

(10) Patent No.: US 10,488,574 B2
(45) Date of Patent: Nov. 26, 2019

(54) DISPLAY DEVICE AND LIGHT SOURCE DEVICE

(71) Applicant: Japan Display Inc., Tokyo (JP)

(72) Inventors: Kentaro Okuyama, Tokyo (JP); Akira Sakaigawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/814,976

(22) Filed: Jul. 31, 2015

(65) Prior Publication Data
US 2016/0070047 A1 Mar. 10, 2016

(30) Foreign Application Priority Data
Sep. 5, 2014 (JP) .................................. 2014-181127

(51) Int. Cl.
*F21V 8/00* (2006.01)
*G02F 1/13* (2006.01)
(Continued)

(52) U.S. Cl.
CPC ............ *G02B 6/005* (2013.01); *G02F 1/1326* (2013.01); *G02F 1/133617* (2013.01); *G02F 1/1334* (2013.01); *G02F 2001/133614* (2013.01)

(58) Field of Classification Search
CPC ............. G02F 1/1334; G02F 1/133615; G02F 1/133602; G02F 1/133603; G02F 1/133606; G02F 1/133609; G02F 1/133611; G02F 1/13476; G02F 1/133604; G02F 2001/133601; G02F 2/1326;
(Continued)

(56) References Cited

U.S. PATENT DOCUMENTS 6,608,657 B2 * 8/2003 Hiyama ............... G02B 6/0033
349/62
7,686,493 B2 * 3/2010 Roshan .................. B82Y 20/00
313/504

(Continued)

FOREIGN PATENT DOCUMENTS

CN 102759050 A 10/2012
CN 103502722 A 1/2014
(Continued)

OTHER PUBLICATIONS

Taiwanese Office Action dated Jun. 29, 2016 for corresponding Taiwanese Patent Application No. 104124789.
(Continued)

*Primary Examiner* — Jessica M Merlin
(74) *Attorney, Agent, or Firm* — Michael Best & Friedrich LLP

(57) ABSTRACT

A display device includes a light source device including a light emission section which emits incident light, a light conversion section which receives the incident light and which converts the intensity of the incident light, and a white light conversion section which converts the light with the converted intensity to white light. With the light source device light emitted from the light conversion section is converted to white light by the white light conversion section. As a result, white light in which chromaticity deviation is reduced is used as a light source. With a display device in which white light is used as backlight light, image quality degradation is reduced.

11 Claims, 16 Drawing Sheets

(51) Int. Cl.
*G09G 3/34* (2006.01)
*G09G 3/36* (2006.01)
*G02F 1/1334* (2006.01)
*G02F 1/1335* (2006.01)

(58) Field of Classification Search
CPC ....... G02F 2001/133614; G02F 1/1326; G02B 6/005; G02B 6/0073; G09G 3/3607; G09G 3/3426; G09G 3/342; G09G 2360/16
See application file for complete search history.

(56) References Cited

U.S. PATENT DOCUMENTS

| | | | | |
|---|---|---|---|---|
| 8,035,772 B2* | 10/2011 | Kim | ................ | G02F 1/133603 349/69 |
| 8,259,384 B2* | 9/2012 | Uchida | ................ | G02F 1/1334 349/65 |
| 8,446,548 B2* | 5/2013 | Uehara | ................ | G02B 6/0016 349/86 |
| 9,069,208 B2* | 6/2015 | Shinkai | ................ | G02B 6/0036 |
| 9,690,037 B2* | 6/2017 | Ham | ................ | G02F 1/133603 |
| 9,726,928 B2* | 8/2017 | Kang | ................ | G02F 1/133524 |
| 2002/0033909 A1 | 3/2002 | Hiyama et al. | | |
| 2002/0154256 A1 | 10/2002 | Gotoh et al. | | |
| 2008/0002429 A1 | 1/2008 | Noba | | |
| 2008/0303407 A1* | 12/2008 | Brunner | ............. | C09K 11/0883 313/496 |
| 2010/0085510 A1 | 4/2010 | Okuyama et al. | | |
| 2010/0165450 A1 | 7/2010 | Okuyama et al. | | |
| 2010/0246160 A1* | 9/2010 | Ito | ................ | G02F 1/133603 362/84 |
| 2010/0315568 A1* | 12/2010 | Chien | ................ | C09K 19/52 349/33 |
| 2011/0109663 A1 | 5/2011 | Uchida et al. | | |
| 2011/0141551 A1 | 6/2011 | Uchida et al. | | |
| 2011/0242146 A1 | 10/2011 | Uchida et al. | | |
| 2011/0249221 A1 | 10/2011 | Uchida et al. | | |
| 2011/0267382 A1* | 11/2011 | Fergason | ............. | G02F 1/1336 345/690 |
| 2012/0098875 A1 | 4/2012 | Shinkai et al. | | |
| 2012/0147292 A1* | 6/2012 | Kasano | ................ | G02F 1/1335 349/64 |
| 2012/0257139 A1 | 10/2012 | Shinkai et al. | | |
| 2012/0274867 A1 | 11/2012 | Shinkai et al. | | |
| 2012/0281273 A1 | 11/2012 | Shinkai et al. | | |
| 2013/0016296 A1* | 1/2013 | Fujita | ................ | H01L 27/322 349/42 |
| 2013/0258711 A1 | 10/2013 | Okuyama et al. | | |
| 2013/0265522 A1* | 10/2013 | Jung | ................ | G02F 1/1336 349/61 |
| 2013/0314620 A1 | 11/2013 | Ebisui et al. | | |
| 2013/0335677 A1* | 12/2013 | You | ................ | G02F 1/133609 349/65 |
| 2014/0036176 A1 | 2/2014 | Shinkai et al. | | |
| 2014/0055835 A1 | 2/2014 | Shinkai et al. | | |
| 2014/0104521 A1 | 4/2014 | Nishimura et al. | | |
| 2014/0139461 A1 | 5/2014 | Furukawa et al. | | |
| 2014/0140653 A1* | 5/2014 | Brown | ................ | G02B 6/0033 385/10 |
| 2014/0232834 A1 | 8/2014 | Sato et al. | | |
| 2014/0300528 A1 | 10/2014 | Ebisui et al. | | |
| 2015/0109763 A1* | 4/2015 | Shinkai | ................ | G02F 1/1334 362/97.2 |
| 2015/0131029 A1* | 5/2015 | Kaida | ............... | G02F 1/133617 349/69 |
| 2015/0177438 A1* | 6/2015 | Drolet | ................ | G02B 6/0035 349/65 |

FOREIGN PATENT DOCUMENTS

| | | |
|---|---|---|
| JP | 2007-206373 A | 8/2007 |
| JP | 2008-010291 A | 1/2008 |
| JP | 2010-092682 A | 4/2010 |
| JP | 2010-156811 A | 7/2010 |
| JP | 2011-119210 A | 6/2011 |
| JP | 2011-142065 A | 7/2011 |
| JP | 2011-222199 A | 11/2011 |
| JP | 2012-089385 A | 5/2012 |
| JP | 2012-141588 A | 7/2012 |
| JP | 2012-151081 A | 8/2012 |
| JP | 2012-252835 A | 12/2012 |
| JP | 2012252835 A | 12/2012 |
| JP | 2013-243089 A | 12/2013 |
| JP | 2014-038695 A | 2/2014 |
| KR | 20020011855 A | 2/2002 |
| KR | 20120018490 A | 3/2012 |
| TW | I296728 B | 5/2008 |
| TW | M457201 U1 | 7/2013 |
| TW | 201400946 A | 1/2014 |

OTHER PUBLICATIONS

Korean Office Action dated May 13, 2016 for corresponding Korean Patent Application No. 10-2015-0111508.
Taiwanese Office Action dated Jan. 3, 2017 for corresponding Taiwanese Patent Application No. 104124789.
Chinese Office Action dated Nov. 29, 2018 for the corresponding Chinese Patent Application No. 201510493653.2.
Chinese Office Action dated Jun. 5, 2019, corresponding to Chinese Patent Application No. 201510493653.2.

* cited by examiner

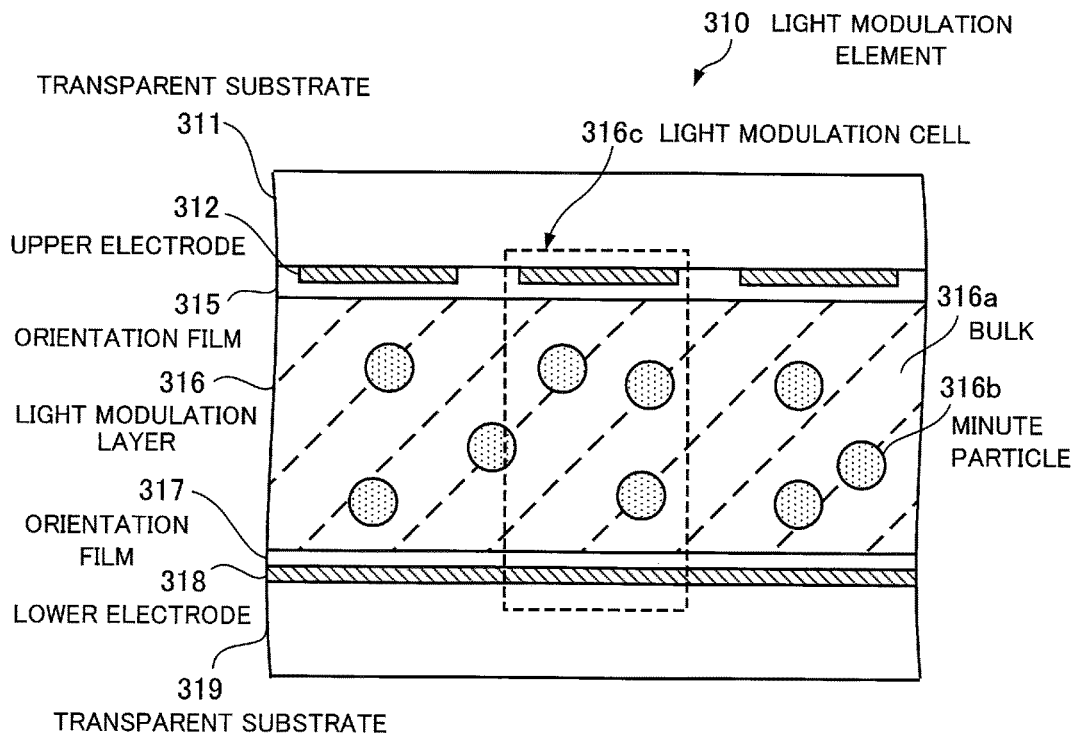
FIG. 7A
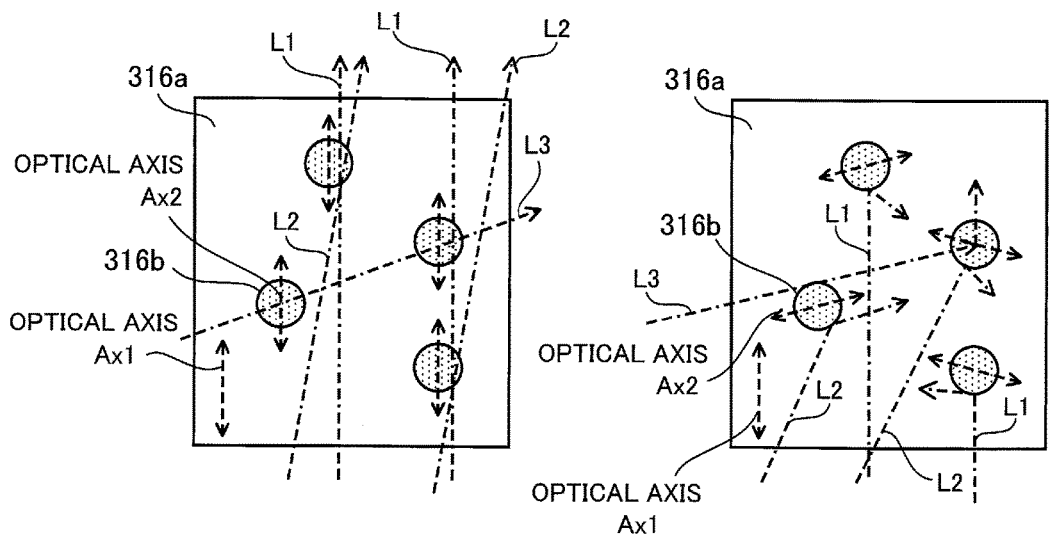
FIG. 7B
FIG. 7C

FIG. 11A — 124a REQUIRED LUMINANCE VALUE INFORMATION

| M\N | 1 | 2 | 3 | 4 | 5 | 6 |
|---|---|---|---|---|---|---|
| 6 | 1.0 | 1.5 | 1.0 | 3.0 | 1.5 | 2.5 |
| 5 | 2.0 | 3.0 | 2.5 | 3.0 | 3.0 | 3.0 |
| 4 | 4.0 | 3.0 | 4.0 | 2.5 | 3.0 | 3.5 |
| 3 | 2.0 | 1.0 | 1.5 | 1.0 | 1.0 | 1.5 |
| 2 | 4.0 | 3.0 | 4.0 | 1.0 | 2.0 | 3.0 |
| 1 | 4.0 | 3.0 | 4.0 | 2.0 | 3.0 | 4.0 |

FIG. 11B — 124a REQUIRED LUMINANCE VALUE INFORMATION

| M\N | 1 | 2 | 3 | 4 | 5 | 6 |
|---|---|---|---|---|---|---|
| 6 | 3.0 | 3.0 | 3.0 | 3.0 | 3.0 | 3.0 |
| 5 | 3.0 | 3.0 | 3.0 | 3.0 | 3.0 | 3.0 |
| 4 | 3.0 | 3.0 | 3.0 | 3.0 | 3.0 | 3.0 |
| 3 | 3.0 | 3.0 | 3.0 | 3.0 | 3.0 | 3.0 |
| 2 | 3.0 | 3.0 | 3.0 | 3.0 | 3.0 | 3.0 |
| 1 | 3.0 | 3.0 | 3.0 | 3.0 | 3.0 | 3.0 |

FIG. 11C — 124a REQUIRED LUMINANCE VALUE INFORMATION

| M\N | 1 | 2 | 3 | 4 | 5 | 6 |
|---|---|---|---|---|---|---|
| 6 | 0 | 0 | 0 | 0 | 0 | 0 |
| 5 | 0 | 0 | 0 | 0 | 0 | 0 |
| 4 | 4.0 | 4.0 | 4.0 | 4.0 | 4.0 | 4.0 |
| 3 | 4.0 | 4.0 | 4.0 | 4.0 | 4.0 | 4.0 |
| 2 | 0 | 0 | 0 | 0 | 0 | 0 |
| 1 | 0 | 0 | 0 | 0 | 0 | 0 |

…

DISPLAY DEVICE AND LIGHT SOURCE DEVICE

CROSS-REFERENCE TO RELATED APPLICATION

This application is based upon and claims the benefit of priority of the prior Japanese Patent Application No. 2014-181127, filed on Sep. 5, 2014, the entire contents of which are incorporated herein by reference.

FIELD

The embodiments discussed herein are related to a display device and a light source device.

BACKGROUND

In order to display a high-contrast image, reduce power consumption, and so on, it is possible to partially drive an edge light type light source device included in a display device. That is to say, white light introduced into a light guide plate is used and light is emitted partially from the light guide plate. With such a light source device a technique for reducing luminance irregularity or color irregularity which occurs at partial drive time is proposed (see, for example, Japanese Laid-open Patent Publication No. 2012-252835).

SUMMARY

There are provided a display device and a light source device which suppress image quality degradation.

According to an aspect, there is provided a display device including a light source device including a light emission section which emits incident light, a light conversion section which receives the incident light and which converts intensity of the incident light, and a white light conversion section which converts the incident light with the converted intensity to white light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A, 7B, and 7C are sectional views of an example of the structure of the light modulation element in the second embodiment;

FIGS. 11A, 11B, and 11C illustrate examples of required luminance values according to blocks of the surface light source device included in the display device according the second embodiment;

DESCRIPTION OF EMBODIMENTS

Figure 1:
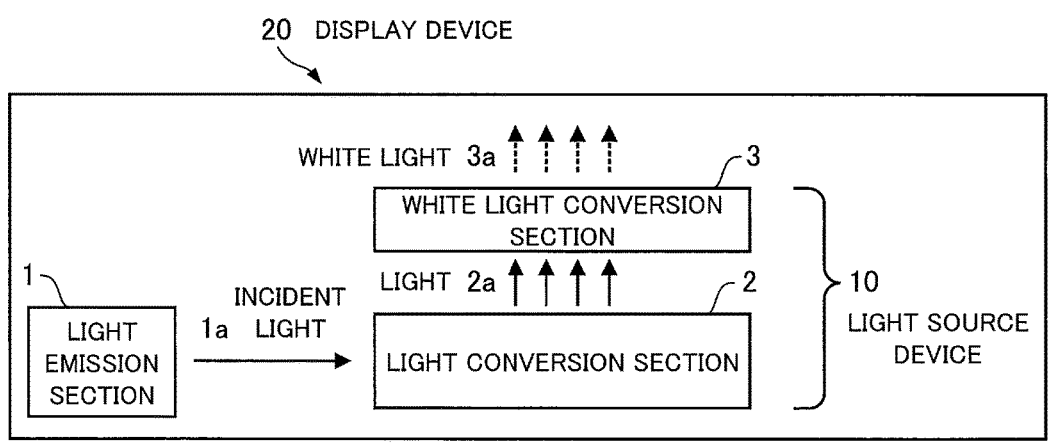
FIG. 1 illustrates an example of the structure of a display device according to a first embodiment.

Embodiments will now be described with reference to the accompanying drawings, wherein like reference numerals refer to like elements throughout.

Disclosed embodiments are simple examples. It is a matter of course that a proper change which suits the spirit of the invention and which will readily occur to those skilled in the art falls within the scope of the present invention. Furthermore, in order to make description clearer, the width, thickness, shape, or the like of each component may schematically be illustrated in the drawings compared with the real state. However, it is a simple example and the interpretation of the present invention is not restricted.

In addition, in the present invention and the drawings the same components that have already been described in previous drawings are marked with the same numerals and detailed descriptions of them may be omitted according to circumstances.

First Embodiment

A display device according to a first embodiment will be described by the use of FIG. 1.

FIG. 1 illustrates an example of the structure of a display device according to a first embodiment.

A display device 20 includes a light source device 10 which includes a light emission section 1, a light conversion section 2, and a white light conversion section 3.

The light emission section 1 emits incident light 1a. The incident light 1a is, for example, blue light other than white light.

The light conversion section 2 receives the incident light 1*a*, converts the intensity of the incident light 1*a* to generate light 2*a*, and emits the light 2*a*. The intensity of the incident light 1*a* is the luminance, the value, or the like of the incident light 1*a*. The light conversion section 2 includes, for example, a polymer dispersed liquid crystal layer and uses the polymer dispersed liquid crystal layer for diffusing the incident light 1*a* which passes through the polymer dispersed liquid crystal layer. Thus, the light conversion section 2 converts the intensity of the incident light 1*a* and emits the light 2*a*. Furthermore, an emission surface of the light conversion section 2 including the polymer dispersed liquid crystal layer includes plural areas and the intensity of the incident light 1*a* is converted according to the areas. Accordingly, the light 2*a* can be emitted partially from the emission surface.

The white light conversion section 3 converts the light 2*a* to white light 3*a*.

A case where the light emission section 1 emits white light and where the light emission section 1 makes the white light enter the light conversion section 2 will now be described. For example, a principal plane of the light conversion section 2 is rectangular. White light emitted from the light emission section 1 enters the light conversion section 2 from a side to the principal plane. Furthermore, the white light which enters the light conversion section 2 is emitted from the principal plane. The light conversion section 2 converts the intensity of the white light which enters the light conversion section 2 and emits the white light from all or part of the areas (white light conversion section 3 is unnecessary). With the light conversion section 2, however, chromaticity deviation occurs between light components with different wavelengths contained in emitted white light if the distance from the side from which the white light enters is long. The reason for this may be as follows. Materials which form the inside of the light conversion section 2 have the dependence of light absorption, reflection, scattering, and transmission on wavelength, so it is difficult for the white light which contains light components with different wavelengths to spread in the light conversion section 2. As a result, chromaticity deviation occurs in the white light emitted from the light conversion section 2.

Accordingly, with the light source device 10 included in the display device 20, the incident light 1*a* emitted from the light emission section 1 is made to enter the light conversion section 2. In order to suppress chromaticity deviation which occurs in the light 2*a* due to the dependence of the optical characteristics of the above materials which form the inside of the light conversion section 2 on wavelength, a dominant wavelength and a half-value width of the incident light 1*a* emitted from the light emission section 1 are selected. The dominant wavelength and the half-value width of the incident light 1*a* are selected in a wavelength region in which the optical characteristics of the materials that form the inside of the light conversion section 2 are not appreciably influenced. From the viewpoint of suppressing chromaticity deviation, it is desirable that a half-value width of the light spectrum of the incident light 1*a* be narrow. From the viewpoint of the intensity of the white light 3*a* finally obtained, however, it is desirable that a half-value width of the light spectrum of the incident light 1*a* be wide. A half-value width of the light spectrum of the incident light 1*a* is properly adjusted by an application. It is desirable that the incident light 1*a* be blue light, ultraviolet-region monochromatic light, or the like. A light source spectrum substantially close to monochromatic light is desirable. A wavelength region in which the optical characteristics of the materials which form the inside of the light conversion section 2 are not appreciably influenced is desirable. A light source spectrum may contain plural spectra. Accordingly, the light conversion section 2 can reduce chromaticity deviation which occurs in the light 2*a* obtained by converting the intensity of the incident light 1*a* which is made to enter the light conversion section 2. The light 2*a* which is emitted in this way from the light conversion section 2 and which is equal in color to the incident light 1*a* is converted to the white light 3*a* by the white light conversion section 3. As a result, the white light 3*a* in which chromaticity deviation is reduced is used as a light source. With the display device 20 in which the white light 3*a* is used as backlight light, image quality degradation is reduced.

Second Embodiment

In a second embodiment the display device according to the first embodiment will be described more concretely.

First an example of the hardware configuration of a display device according to a second embodiment will be described by the use of FIG. 2.

Figure 2:
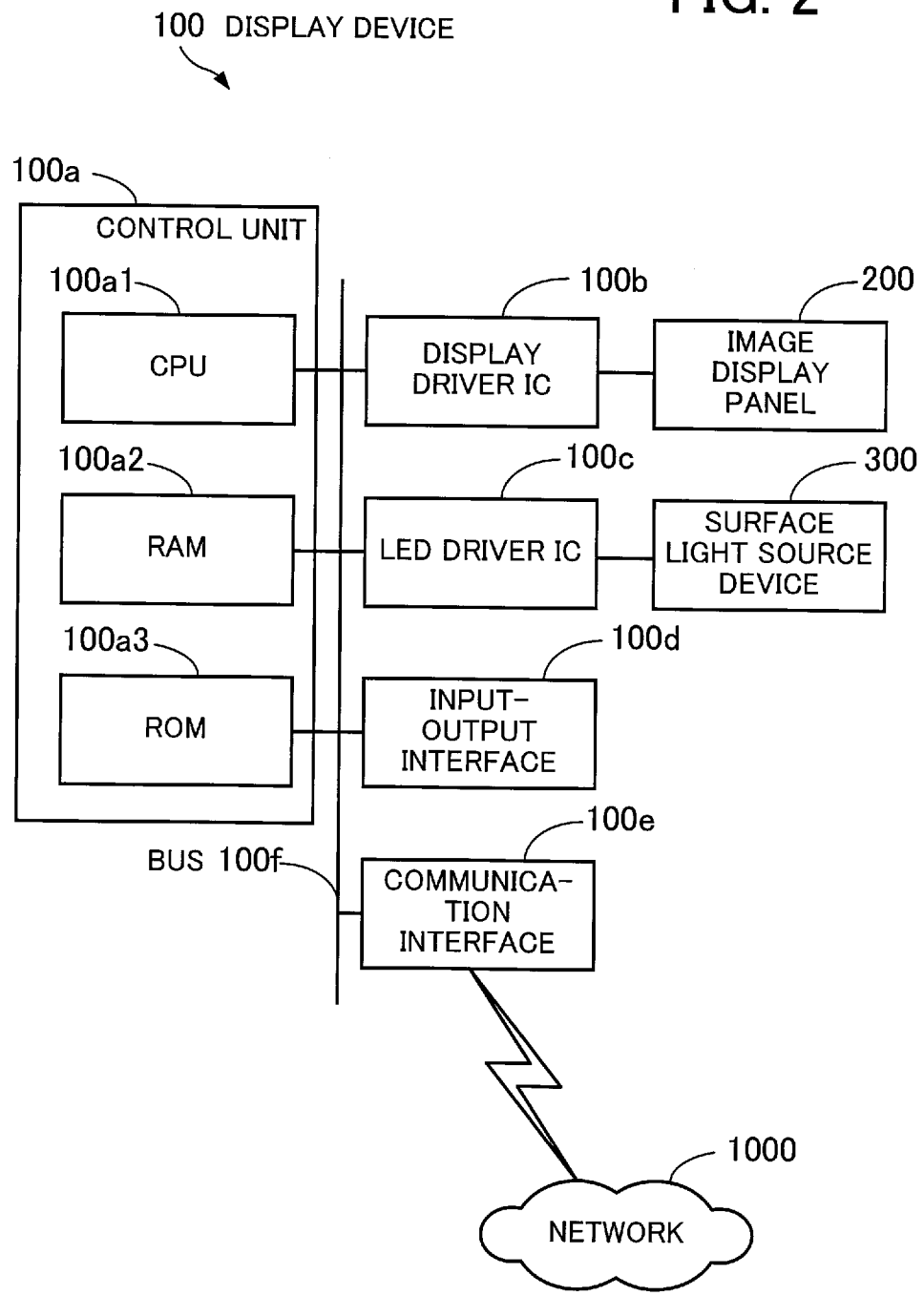
FIG. 2 illustrates an example of the hardware configuration of a display device according to a second embodiment.

FIG. 2 illustrates an example of the hardware configuration of a display device according to a second embodiment.

A display device 100 is an embodiment of the display device 20 illustrated in FIG. 1 and the whole of the display device 100 is controlled by a control unit 100*a*.

The control unit 100*a* includes a central processing unit (CPU) 100*a*1. A random access memory (RAM) 100*a*2, a read only memory (ROM) 100*a*3, and a plurality of peripheral units are connected to the CPU 100*a*1 via a bus 100*f* so as to input or output a signal between them.

The CPU 100*a*1 controls the whole of the display device 100 on the basis of an operating system (OS) program and application programs stored in the ROM 100*a*3 and various pieces of data expanded in the RAM 100*a*2. When the CPU 100*a*1 performs a process, the CPU 100*a*1 may operate on the basis of the OS program and an application program temporarily stored in the RAM 100*a*2.

The RAM 100*a*2 is used as main storage of the control unit 100*a*. The RAM 102*a*2 temporarily stores at least a part of the OS program or an application program executed by the CPU 100*a*1. In addition, the RAM 100*a*2 stores various pieces of data which the CPU 100*a*1 needs to perform a process.

The ROM 100*a*3 is a read only semiconductor memory and stores the OS program, the application programs, and fixed data which is not rewritten. Furthermore, a semiconductor memory, such as a flash memory, may be used as auxiliary storage in place of the ROM 100*a*3 or in addition to the ROM 100*a*3.

The plurality of peripheral units connected to the bus 100*f* are a display driver integrated circuit (IC) 100*b*, a light emitting diode (LED) driver IC 100*c*, an input-output interface 100*d*, and a communication interface 100*e*.

An image display panel 200 is connected to the display driver IC 100*b*. The display driver IC 100*b* outputs an output signal to the image display panel 200 to display an image on the image display panel 200. The display driver IC 100*b* may realize at least a part of the functions of an image display panel drive section described later.

A surface light source device 300 (corresponding to the light source device 10 in the first embodiment) is connected to the LED driver IC 100*c*. The LED driver IC 100*c* drives a light source according to a light source control signal described later and controls the luminance of the surface light source device 300. The LED driver IC 100c realizes at least a part of the functions of a surface light source device drive section described later.

An input device used for inputting a user's instructions is connected to the input-output interface 100d. An input device, such as a keyboard, a mouse used as a pointing device, or a touch panel, is connected. The input-output interface 100d transmits to the CPU 100a1 a signal transmitted from the input device.

The communication interface 100e is connected to a network 1000. The communication interface 100e transmits data to or receives data from another computer or a communication apparatus via the network 1000.

By adopting the above hardware configuration, the processing functions in the second embodiment are realized.

An example of the structure of the image display panel 200 will now be described by the use of FIG. 3. A case where a red (R) subpixel, a green (G) subpixel, a blue (B) subpixel, and a white (W) subpixel are used will now be described as an example. However, the same applies to a case where an R subpixel, a G subpixel, and a B subpixel are used or a monochrome display panel in which no color filters are used.

Figure 3:
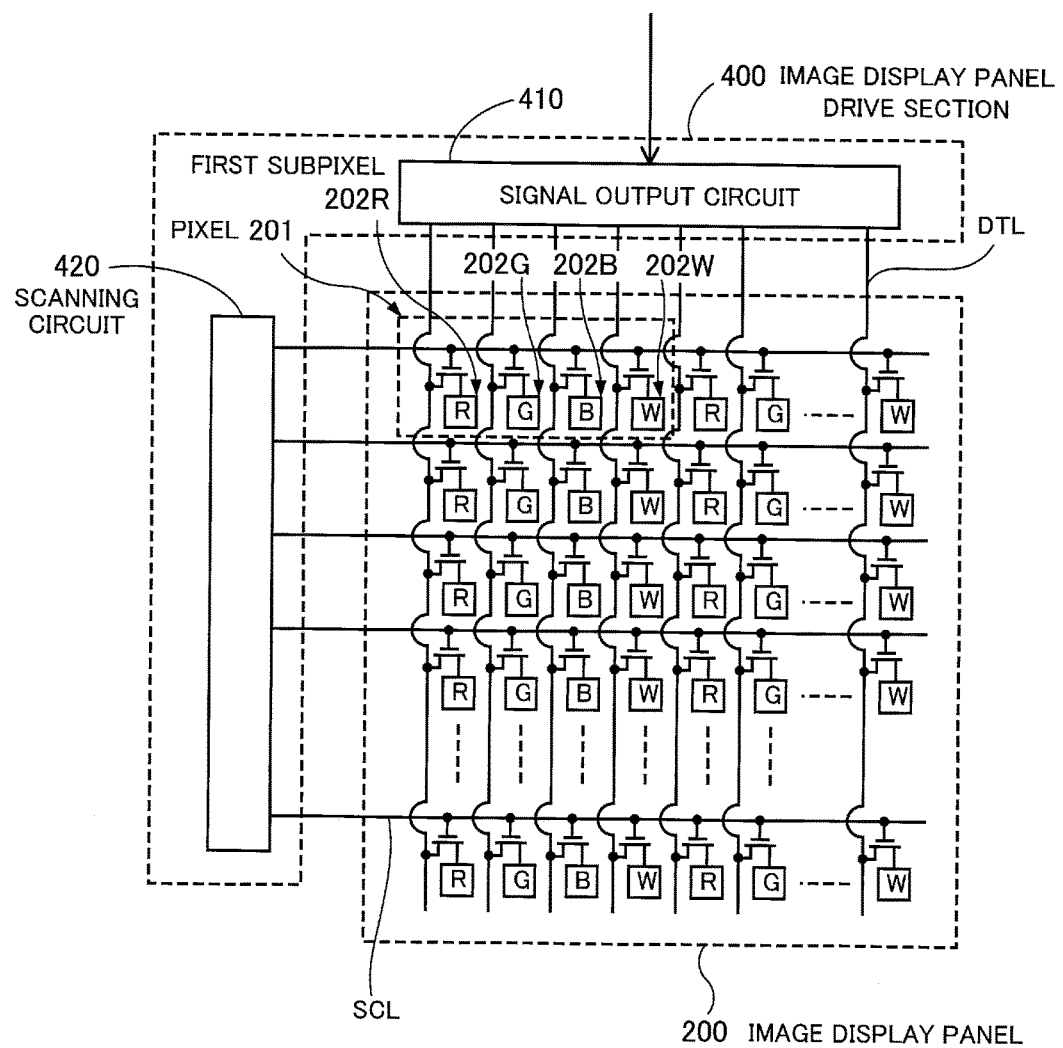
FIG. 3 illustrates an example of the structure of an image display panel in the second embodiment.

FIG. 3 illustrates an example of the structure of the image display panel in the second embodiment.

With the image display panel 200 each of pixels 201 arranged in a two-dimensional matrix includes a first subpixel 202R, a second subpixel 202G, a third subpixel 202B, and a fourth subpixel 202W. The first subpixel 202R displays red, the second subpixel 202G displays green, the third subpixel 202B displays blue, and the fourth subpixel 202W displays white. However, colors which the first subpixel 202R, the second subpixel 202G, and the third subpixel 202B display are not limited to them. The first subpixel 202R, the second subpixel 202G, and the third subpixel 202B may display other different colors. For example, the first subpixel 202R, the second subpixel 202G, and the third subpixel 202B may display the complementary colors of red, green, and blue respectively. Furthermore, a color which the fourth subpixel 202W displays is not limited to white. For example, the fourth subpixel 202W may display yellow. However, white is effective in reducing power consumption. It is desirable that if the first subpixel 202R, the second subpixel 202G, the third subpixel 202B, and the fourth subpixel 202W are lighted at the same light source lighting amount, the fourth subpixel 202W be brighter than the first subpixel 202R, the second subpixel 202G, and the third subpixel 202B. If there is no need to distinguish among the first subpixel 202R, the second subpixel 202G, the third subpixel 202B, and the fourth subpixel 202W, then the term "subpixels 202" will be employed in the following description.

More specifically, the image display panel 200 is a transmission type color liquid crystal display panel. Color filters which transmits red light, green light, and blue light are disposed between the first subpixel 202R, the second subpixel 202G, and the third subpixel 202B, respectively, and an observer of an image. Furthermore, a color filter is not disposed between the fourth subpixel 202W and an observer of an image. The fourth subpixel 202W may include a transparent resin layer in place of a color filter. If a color filter is not disposed between the fourth subpixel 202W and an observer of an image, a great difference in level arises between the fourth subpixel 202W and the first subpixel 202R, the second subpixel 202G, and the third subpixel 202B. The formation of a transparent resin layer prevents a great difference in level from arising between the fourth subpixel 202W and the first subpixel 202R, the second subpixel 202G, and the third subpixel 202B.

A signal output circuit 410 and a scanning circuit 420 included in an image display panel drive section 400 are electrically connected to the first subpixels 202R, the second subpixels 202G, the third subpixels 202B, and the fourth subpixels 202W of the image display panel 200 via signal lines DTL and scanning lines SCL respectively. The subpixels 202 are connected not only to the signal lines DTL but also to the scanning lines SCL via switching elements (such as thin film transistors (TFTs)). The image display panel drive section 400 selects subpixels 202 by the scanning circuit 420 and outputs image signals in order from the signal output circuit 410. By doing so, the image display panel drive section 400 controls the operation (light transmittance) of the subpixels 202.

An example of the structure of the surface light source device 300 will now be described by the use of FIGS. 4 and 5.

Figure 4:
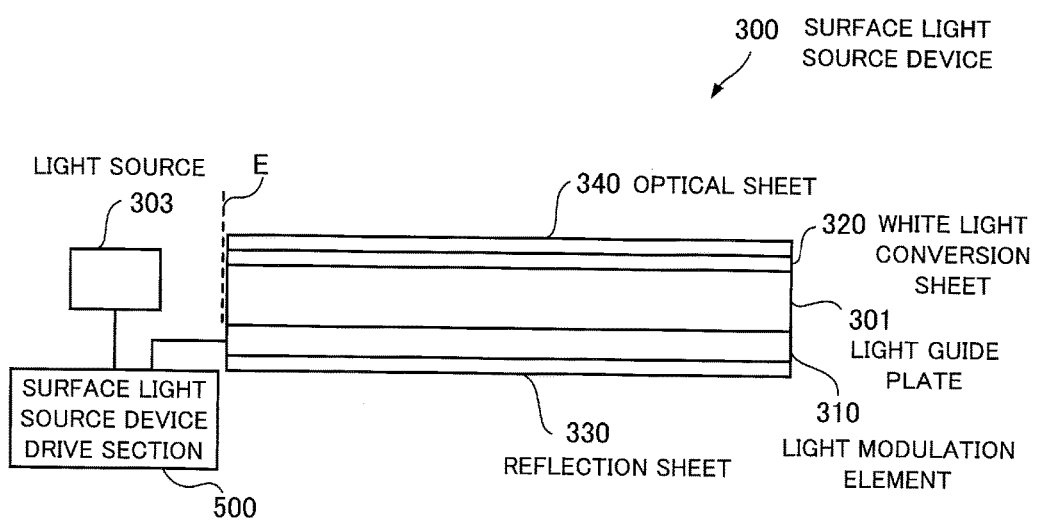
FIG. 4 is a side-view of an example of the structure of a surface light source device in the second embodiment.
Figure 5:
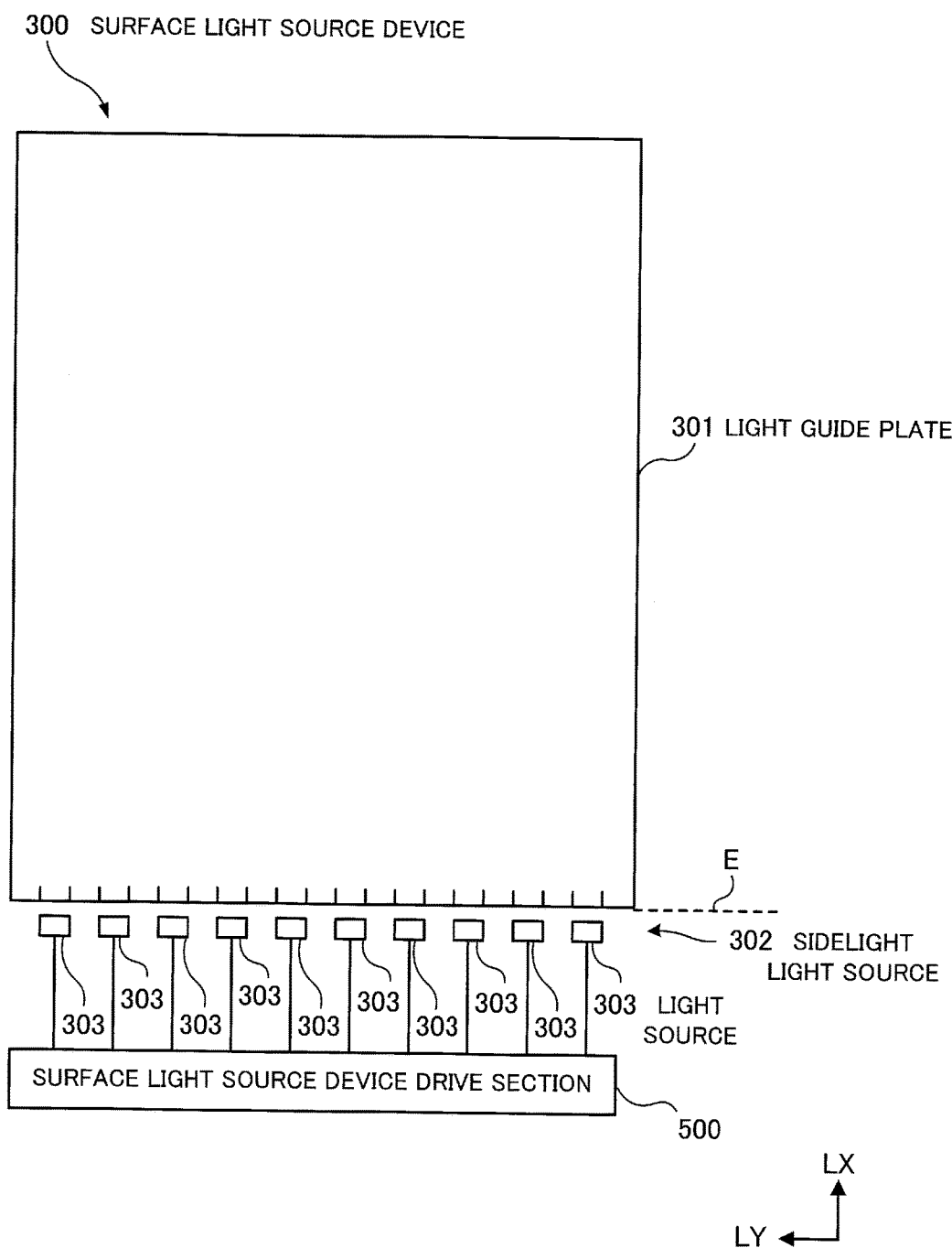
FIG. 5 is a plan view of an example of the structure of the surface light source device in the second embodiment.

FIG. 4 is a side-view of an example of the structure of the surface light source device in the second embodiment. FIG. 5 is a plan view of an example of the structure of the surface light source device in the second embodiment.

The surface light source device 300 is disposed on the back side of the image display panel 200 and emits light at the back of the image display panel 200. As illustrated in FIGS. 4 and 5, the surface light source device 300 includes a light guide plate 301 and a sidelight light source 302 in which a plurality of light sources 303 are arranged opposite an incident surface E that is at least one side of the light guide plate 301. In addition, the surface light source device 300 includes a light modulation element 310, a white light conversion sheet 320 placed over the light guide plate 301, a reflection sheet 330 placed under the light modulation element 310, and an optical sheet 340 placed over the light guide plate 301 with the white light conversion sheet 320 therebetween.

The light guide plate 301 guides light emitted from the sidelight light source 302 (light sources 303) disposed on the side of light guide plate 301 to the upper surface of the light guide plate 301. The shape of the light guide plate 301 corresponds to that of the image display panel 200 disposed on the upper surface side of the surface light source device 300. The light guide plate 301 also functions as a support for supporting the optical sheet 340 (such as a diffusion plate, a diffusion sheet, a lens film, or a polarized-light separation sheet) disposed between the image display panel 200 and the light guide plate 301 (with the white light conversion sheet 320 therebetween). The light guide plate 301 is made mainly of a transparent thermoplastic resin, such as polycarbonate resin (PC) or acrylic resin (polymethyl methacrylate (PMMA), glass, or the like. Furthermore, if one of these transparent materials is used as a substrate of the light modulation element described later, the substrate also functions as a light guide plate.

Each light source 303 of the sidelight light source 302 is a light-emitting diode (LED) which emits incident light (such as blue light which is monochromatic light), and its current value or PWM value (duty ratio, for example) can be controlled independently. As illustrated in FIG. 5, the light sources 303 are arranged along the one side of the light guide plate 301. It is assumed that the direction in which the light sources 303 are arranged is a light source arrangement direction LY. Incident light emitted from the light sources 303 enters the light guide plate 301 from the incident surface E in an incident direction LX perpendicular to the light source arrangement direction LY. A semiconductor laser may be used in place of a light-emitting diode as each light source 303.

The light modulation element 310 controls the intensity of incident light which is made by the light guide plate 301 to enter, and emits light which is equal in color to the incident light from an emission surface to the back side of the image display panel 200. The details of the light modulation element 310 will be described later.

The white light conversion sheet 320 coverts light which is emitted from the light modulation element 310 and which passes through the light guide plate 301 to white light, and emits the white light to the back of the image display panel 200. A phosphor sheet, a quantum dot sheet, or the like is used as the white light conversion sheet 320. More specifically, a known material, such as oxide, nitride, oxynitride, or sulfide, is used as a phosphor. If blue light is used as incident light, then the blue light is converted to, for example, green light and red light or green light and yellow light. By doing so, the blue light is converted to white light. With a green light emitting phosphor material Eu or Mn is used as an emission center. (Ba, Sr, Mg)$_2$SiO$_4$:Eu, Mn, Sr$_3$Si$_{13}$Al$_3$O$_2$N$_{21}$:Eu, Zn$_2$SiO$_4$:Mn, or the like is used. Sr$_2$Si$_7$Al$_2$ON$_{13}$:Eu or La$_2$O$_2$S:Eu is used as a red light emitting phosphor material with Eu or the like as an emission center. (Ba, Sr, Mg)$_2$SiO$_4$:Eu, a Mn-based material, or a YAG-based material is used as a yellow light emitting phosphor material. If ultraviolet rays are used, a blue light emitting phosphor material is used. A known material, such as BaAlMn:Eu (BAM-based material), Sr$_{10}$(PO$_4$)$_6$Cl$_2$:Eu, or (Sr, Ba, Ca)$_{10}$(PO$_4$)$_6$Cl$_2$:Eu, is used. With application to a display, conversion to white light is desirable. However, conversion to, for example, yellow light other than white light is possible according to uses. A phosphor sheet may be formed by coating a plastic film with an inorganic material, a resin binder, additives, or the like or by forming a film directly on a plastic film by a sputtering method, an evaporation method, or the like. In the second embodiment it is desirable to convert light from the white light conversion sheet 320 and emit white light in the same direction. Therefore, it is desirable that back scattering be small. In order to decrease back scattering (increase forward scattering), it is desirable to make the size of particles in a phosphor material small and make the thickness of a coating thin.

The reflection sheet 330 returns to the light guide plate 301 side light which leaks out from the back (lower surface in FIG. 4) of the light guide plate 301 through the light modulation element 310, and has the functions of reflection, diffusion, scattering, and the like. This makes it possible to efficiently utilize incident light from the light sources 303, and contributes to an increase in the luminance of an emission surface of the surface light source device 300. Foamed polyethylene terephthalate (PET), a silver-evaporated film, a multilayer reflection film, white PET, or the like is used as the reflection sheet 330. In FIG. 4, the light guide plate 301 and the light modulation element 310 are optically joined without an air layer therebetween. Actually, however, the reflection sheet 330, the white light conversion sheet 320, and the optical sheet 340 are laminated with an air layer therebetween and are not optically joined. Furthermore, in the example of FIG. 4, the white light conversion sheet 320 is inserted between the light guide plate 301 and the optical sheet 340. However, the white light conversion sheet 320 may be placed over the optical sheet 340. In addition, in order to increase white light conversion efficiency, plural white light conversion sheets 320 may be inserted between the light modulation element 310 and the reflection sheet 330.

A surface light source device drive section 500 is connected to the sidelight light source 302 (light sources 303) and the light modulation element 310 so that a signal can be transmitted. The surface light source device drive section 500 adjusts a current value or a PWM value supplied to each light source 303 on the basis of a light source control signal described later to control the amount of light emitted from each light source 303 and control the luminance of the surface light source device 300 (intensity of light). Furthermore, the surface light source device drive section 500 adjusts voltage or the like supplied to an upper electrode and a lower electrode of the light modulation element 310 described later in the same way on the basis of the light source control signal. By doing so, the surface light source device drive section 500 controls transmission and scattering of incident light and controls the intensity of light emitted from the emission surface.

The light modulation element 310 included in the above surface light source device 300 will be described by the use of FIGS. 6 and 7A through 7C. In the following description a type ("normally transparent" type) of light modulation element which makes the transition from a transparent state to a scattering state by applying voltage is taken. However, a type ("normally scattering" type) of light modulation element which makes the transition from a scattering state to a transparent state by applying voltage may be used. Furthermore, the light modulation element 310 need only have the function of making the whole or part of light emitted from the light sources 303 enter the light modulation element 310 from the incident surface. Optical phenomena, that is to say, not only transmission and scattering but also diffraction, refraction, and the like are utilized. However, if the application of a lighting device for displays is taken into consideration, then it is desirable to guide incident light to the distance and make the light modulation element 310 emit light efficiently. A normally transparent type of light modulation element is desirable from this viewpoint.

Figure 6:
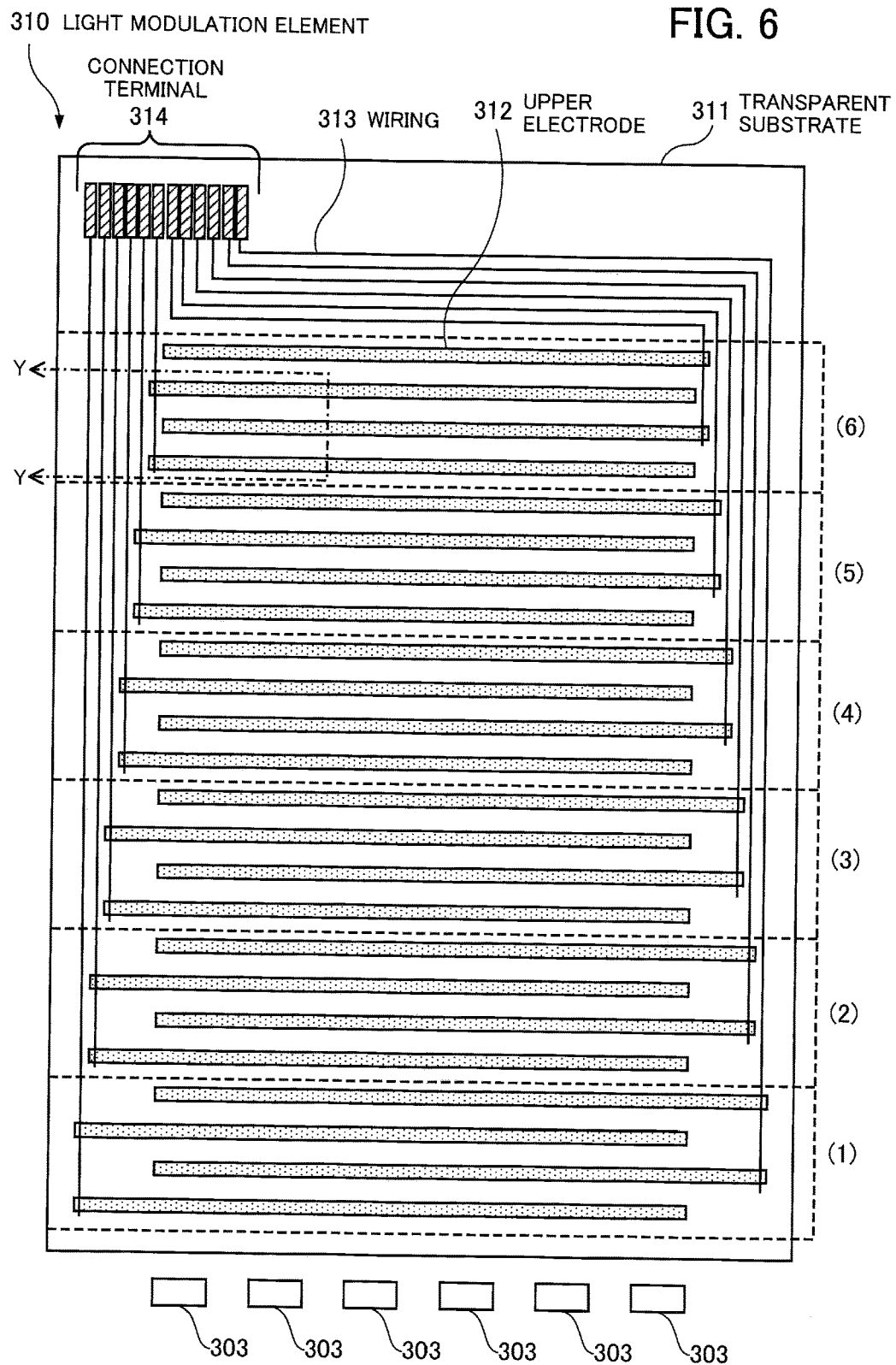
FIG. 6 is a plan view of an example of the structure of upper electrodes of a light modulation element in the second embodiment.

FIG. 6 is a plan view of an example of the structure of upper electrodes of the light modulation element in the second embodiment. FIGS. 7A, 7B, and 7C are sectional views of an example of the structure of the light modulation element in the second embodiment.

FIG. 7A is a sectional view taken along dot-dash lines Y-Y of FIG. 6. FIG. 7B schematically illustrates the orientation states (optical axes Ax1 and Ax2) of a bulk 316a and a minute particle 316b in a light modulation layer 316 which arise in the case of voltage not being applied to upper electrodes 312 or lower electrodes 318. FIG. 7C schematically illustrates the orientation states (optical axes Ax1 and Ax2) of the bulk 316a and the minute particle 316b in the light modulation layer 316 which arise in the case of voltage being applied to the upper electrodes 312 and the lower electrodes 318.

As illustrated in FIG. 7A, the light modulation element 310 includes a transparent substrate 311, the upper electrodes 312, an orientation film 315, the light modulation layer 316, an orientation film 317, the lower electrodes 318, and a transparent substrate 319 disposed in order.

The transparent substrates 311 and 319 support the light modulation layer 316. Usually a substrate, such as a glass plate or a plastic film, which is transparent to visible light is used as the transparent substrate 311 or 319.

The upper electrodes 312 are disposed on the transparent substrate 311 opposite the transparent substrate 319. As illustrated in FIG. 6, for example, the upper electrodes 312 are formed so that each of them will have a long and narrow shape and so that they will extend in one direction in a plane. The upper electrodes 312 are electrically connected to one another by wirings 313 and voltage corresponding to a signal from the surface light source device drive section 500 is applied to connection terminals 314 at the ends of the wirings 313. Furthermore, the lower electrode 318 is disposed on the transparent substrate 319 opposite the transparent substrate 311. Each of the lower electrodes 318 has a long and narrow shape and the lower electrode 318 extends in a plane in one direction which intersects (which is perpendicular to) the direction in which the upper electrodes 312 extend. The lower electrodes 318 are electrically connected to one another by wirings and voltage corresponding to a signal from the surface light source device drive section 500 is applied to connection terminals at the ends of the wirings (not illustrated). This is the same with the upper electrodes 312. The shape of the upper electrodes 312 and the lower electrodes 318 depends on a drive method. As stated above, for example, if each of the upper electrodes 312 and the lower electrodes 318 has a long and narrow shape, then each electrode can be driven by simple matrix drive.

At least the upper electrodes 312 of the upper electrodes 312 and the lower electrodes 318 are made of a transparent conductive material such as indium tin oxide (ITO) or indium zinc oxide (IZO). On the other hand, there is no need to make the lower electrodes 318 of a transparent material. The lower electrodes 318 may be made of, for example, metal. If the lower electrodes 318 are made of metal, then the lower electrodes 318 also have the function of reflecting light which enters the light modulation element 310 from the back (lower surface) of the light guide plate 301. This is the same with the reflection sheet 330. In this case, for example, the reflection sheet 330 illustrated in FIG. 4 may not be used.

When the upper electrodes 312 and the lower electrodes 318 are looked at from the direction of the normal of the emission surface of the light modulation element 310, a portion of the light modulation element 310 in which an upper electrode 312 and a lower electrode 318 are opposite to each other corresponds to a light modulation cell 316c. Each light modulation cell 316c can be driven independently by applying determined voltage to an upper electrode 312 and a lower electrode 318. Each light modulation cell 316c has transparency or a scattering property to incident light from the light sources 303 according to the magnitude of a voltage value applied between an upper electrode 312 and a lower electrode 318.

Furthermore, as described later, the amount of incident light from the side of the surface light source device 300 may be large in an area near the side and be small in an area distant from the side. Accordingly, it is desirable to make an adjustment so as to increase scattering intensity according to an increase in the distance from the side. In order to adjust scattering intensity, electrode area, non-scattering portion area, a drive condition, or the like is adjusted. An adjustment range is the whole of the light modulation element 310, a block to which voltage is applied, a block of the surface light source device 300, or the like. The width of upper electrodes 312 disposed near the sidelight light source 302 is made narrow (distance between upper electrodes 312 disposed near the sidelight light source 302 is made long) and the width of upper electrodes 312 disposed at a distance from the sidelight light source 302 is made wide (distance between upper electrodes 312 disposed at a distance from the sidelight light source 302 is made short). By doing so, lack of uniformity of light emitted from the emission surface of the surface light source device 300 is redressed. It is assumed that the width of the upper electrodes 312 of the surface light source device 300 in the second embodiment is optimized according to their disposition positions. Furthermore, non-scattering portion area is the area of a transparent material partially disposed in place of a light modulation material, and is increased according to an increase in the distance from the side.

The orientation films 315 and 317 orient liquid crystal, a monomer, or the like used as the light modulation layer 316. For example, a vertical orientation film and a horizontal orientation film are the types of orientation films.

The light modulation layer 316 is a polymer dispersed liquid crystal layer and is a composite layer which contains the bulk 316a and the plural minute particles 316b dispersed in the bulk 316a. Minute particles are made mainly of a liquid crystal material. The bulk 316a and the minute particles 316b are optically anisotropic.

First a case where voltage is not applied to an upper electrode 312 or a lower electrode 318 with reference to the above light modulation layer 316 will be described by the use of FIG. 7B.

Each of the optical axes Ax1 and Ax2 indicated in FIGS. 7B and 7C is parallel to a light traveling direction by which a refractive index is constant regardless of a polarization direction. The optical axes Ax1 and Ax2 are schematically indicated for the bulk 316a and the minute particles 316b, respectively, in FIGS. 7B and 7C.

In this case, the direction of the optical axis Ax1 of the bulk 316a and the direction of the optical axis Ax2 of the minute particles 316b match (are parallel to each other) (FIG. 7B). Furthermore, there is no need for the direction of the optical axis Ax1 and the direction of the optical axis Ax2 to always match. There may be a slight deviation between the direction of the optical axis Ax1 and the direction of the optical axis Ax2 due to manufacturing errors or the like.

In addition, the optical axis Ax2 of the minute particles 316b is perpendicular to the surfaces of the transparent substrates 311 and 319. As indicated in FIGS. 7B and 7C, on the other hand, the optical axis Ax1 of the bulk 316a is perpendicular to the surfaces of the transparent substrates 311 and 319 regardless of whether voltage is applied to the upper electrodes 312 and the lower electrodes 318. There is no need for the optical axis Ax2 to always intersect the surfaces of the transparent substrates 311 and 319 at right angles. The optical axis Ax2 may intersect the surfaces of the transparent substrates 311 and 319 at an angle other than 90° due to manufacturing errors or the like. Furthermore, there is no need for the optical axis Ax1 to always intersect the surfaces of the transparent substrates 311 and 319 at right angles. The optical axis Ax1 may intersect the surfaces of the transparent substrates 311 and 319 at an angle other than 90° due to manufacturing errors or the like.

It is desirable that the bulk 316a and the minute particles 316b be equal in ordinary refractive index and extraordinary refractive index. In this case, for example, it is assumed that voltage is not applied between the upper electrodes 312 and the lower electrodes 318. As illustrated in FIG. 7B, at this time there is little difference in refractive index in all directions and great transparency is obtained. As a result, for example, light L1 which travels in the direction of the front (top in FIG. 7B) and light L2 and light L3 which travel in oblique (obliquely upward, in FIG. 7B) directions are not scattered in the light modulation layer 316 and pass through the light modulation layer 316. Accordingly, incident light from the light sources 303 (light which travels from an oblique direction) is totally reflected at the interface of the transparent substrate 311 or the light guide plate 301 (optical sheet 340) and air and is not emitted from the light modulation element 310 to the image display panel 200 side. As a result, the luminance of an area in which voltage is not applied between an upper electrode 312 and a lower electrode 318 is lower than the luminance of an area in which voltage is applied between an upper electrode 312 and a lower electrode 318 and which will be described later.

Next, a case where voltage is applied to an upper electrode 312 and a lower electrode 318 (corresponding to an arbitrary area of the emission surface) with reference to the light modulation layer 316 will be described.

In this case, the optical axis Ax2 of the minute particles 316b inclines due to an electric field between the upper electrode 312 and the lower electrode 318, so the direction of the optical axis Ax1 of the bulk 316a and the direction of the optical axis Ax2 of the minute particles 316b differ from each other (intersect) (FIG. 7C). Furthermore, for example, when voltage is applied between the upper electrode 312 and the lower electrode 318, the optical axis Ax2 of the minute particles 316b intersects the surfaces of the transparent substrates 311 and 319 at an angle other than 90° or is parallel to the surfaces of the transparent substrates 311 and 319. Accordingly, when voltage is applied between the upper electrode 312 and the lower electrode 318, a refractive index difference is large in all directions in the light modulation layer 316 and powerful scattering properties are obtained. As a result, as illustrated in FIG. 7C, for example, light L1 which travels in the direction of the front and light L2 and light L3 which travel in oblique directions are scattered in the light modulation layer 316. Accordingly, incident light from the light sources 303 (light which travels from an oblique direction) passes through the interface of the transparent substrate 311 or the light guide plate 301 (optical sheet 340) and air. In addition, light which travels to the reflection sheet 330 side is reflected from the reflection sheet 330, passes through the light modulation element 310, and is emitted to the image display panel 200 side. Light is taken out of the area in which voltage is applied between the upper electrode 312 and the lower electrode 318, so the luminance of the area is considerably higher than that of an area in which voltage is not applied between an upper electrode 312 and a lower electrode 318.

Light is scattered in this way in an area of the light modulation element 310 in which voltage is applied according to voltage applied between an upper electrode 312 and a lower electrode 318. Accordingly, light is emitted from an arbitrary area of the emission surface of the light modulation element 310. Furthermore, the degree to which light is scattered in the light modulation element 310 changes according to the magnitude of applied voltage, the length of time for which voltage is applied (duty ratio), or the like, so the intensity of light scattered also changes.

There may be a slight deviation between the ordinary refractive index of the bulk 316a and the ordinary refractive index of the minute particles 316b due to manufacturing errors or the like. It is desirable that the deviation between the ordinary refractive index of the bulk 316a and the ordinary refractive index of the minute particles 316b be, for example, 0.1 or less. It is more desirable that the deviation between the ordinary refractive index of the bulk 316a and the ordinary refractive index of the minute particles 316b be 0.05 or less. There may also be a slight deviation between the extraordinary refractive index of the bulk 316a and the extraordinary refractive index of the minute particles 316b due to manufacturing errors or the like. It is desirable that the deviation between the extraordinary refractive index of the bulk 316a and the extraordinary refractive index of the minute particles 316b be, for example, 0.1 or less. It is more desirable that the deviation between the extraordinary refractive index of the bulk 316a and the extraordinary refractive index of the minute particles 316b be 0.05 or less.

In addition, it is desirable that a refractive index difference ($\Delta n_0$=extraordinary refractive index $n_0$–ordinary refractive index $n_1$) of the bulk 316a and a refractive index difference ($\Delta n_1$=extraordinary refractive index $n_2$–ordinary refractive index $n_3$) of the minute particles 316b be as great as possible. It is desirable that a refractive index difference of the bulk 316a and a refractive index difference of the minute particles 316b be 0.05 or greater. It is more desirable that a refractive index difference of the bulk 316a and a refractive index difference of the minute particles 316b be 0.1 or greater. It is most desirable that a refractive index difference of the bulk 316a and a refractive index difference of the minute particles 316b be 0.15 or greater. If a refractive index difference of the bulk 316a and a refractive index difference of the minute particles 316b are great, then the scattering power of the light modulation layer 316 is high. As a result, it is easy to upset light guide conditions and take light out of the light modulation element 310.

The bulk 316a contained in the above light modulation layer 316 has, for example, a streaky structure or a porous structure which does not respond to an electric field or has a rod-like structure whose speed of a response to an electric field is slower than the speed of a response of the minute particles 316b to an electric field. The bulk 316a is formed by polymerizing an orientable and polymerizable material (such as a monomer) which is oriented in the direction in which the minute particles 316b or the orientation films 315 and 317 are oriented by at least one of heat and light. On the other hand, the minute particles 316b are made mainly of a liquid crystal material or the like and their speed of a response to an electric field is much greater than the speed of a response of the bulk 316a to an electric field.

A material which is optically anisotropic and which mixes with liquid crystal may be used as an orientable and polymerizable monomer. In particular, a low-molecular monomer which cures by ultraviolet rays is desirable. It is desirable that liquid crystal and a material (high-molecular material) obtained by polymerizing low-molecular monomers be equal in optical anisotropy direction in a state in which voltage is not applied. Therefore, it is desirable that liquid crystal and low-molecular monomers be oriented in the same direction before curing by ultraviolet rays. If liquid crystal having rod-like molecules is used as the minute particles 316b, it is desirable that a monomer material used have a rod-like shape. From these viewpoints, it is desirable that a polymerizable and liquid crystalline material be used as a monomer material. For example, it is desirable that a material contain as a polymerizable functional group at least one functional group selected from a group made up of acryloyloxy group, methacryloyloxy group, vinyl ether group, and epoxy group. These functional groups are polymerized by irradiating with ultraviolet rays, infrared rays, or electron beams or by heating. In order to suppress a decrease in orientation degree at ultraviolet irradiation time, a liquid crystalline material which contains a multifunctional group may be added. Furthermore, if the orientation film 315 is not used, a state in which these materials are oriented is temporarily brought about by an external field, such as a magnetic field or an electric field, and a monomer is cured by ultraviolet rays, heat, or the like. By doing so, an orientation state is also brought about.

An example of the structure of the functions of the display device 100 having the above structure will now be described by the use of FIG. 8.

Figure 8:
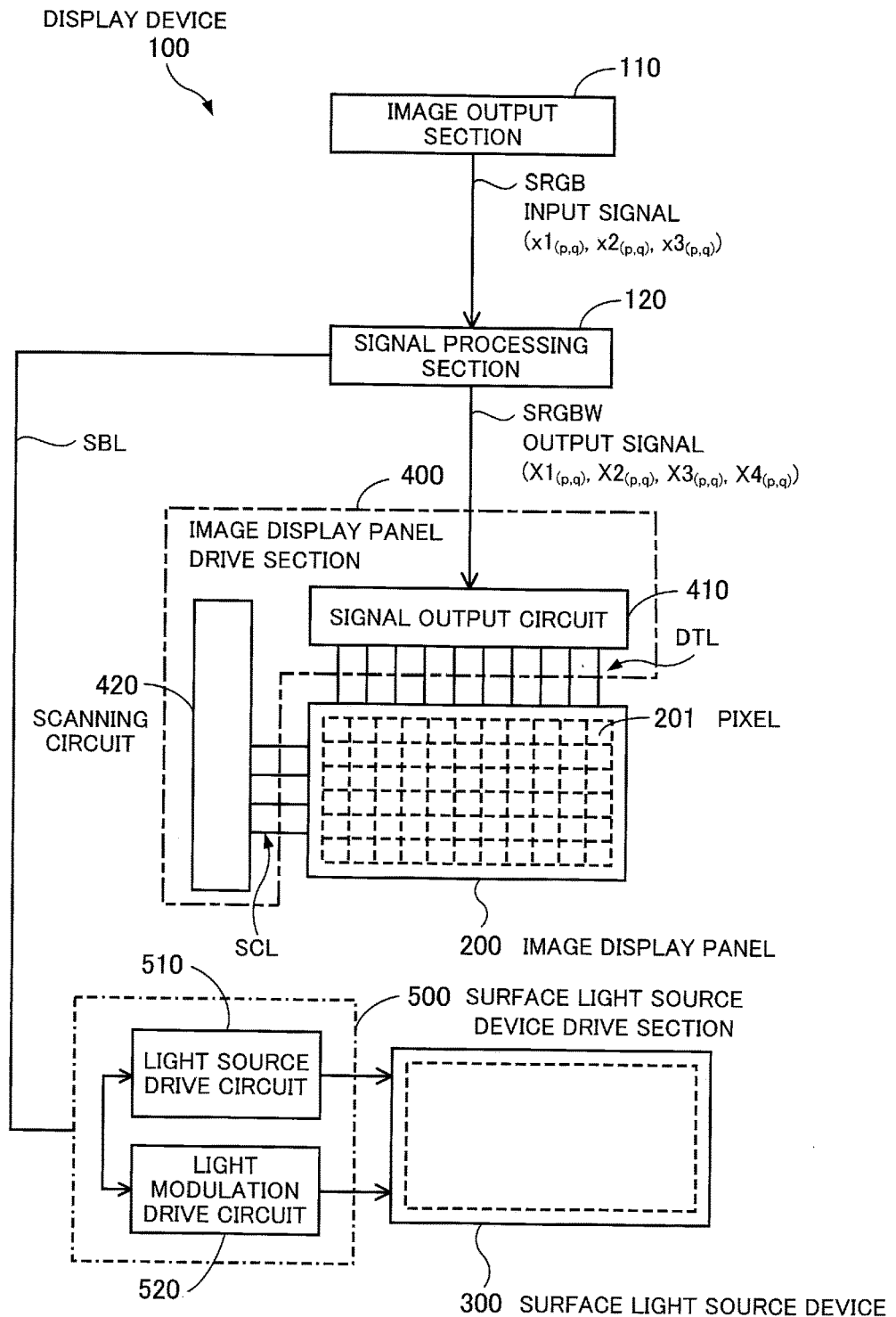
FIG. 8 illustrates an example of the structure of the functions of the display device according to the second embodiment.

FIG. 8 illustrates an example of the structure of the functions of the display device according to the second embodiment.

The display device 100 includes an image output section 110, a signal processing section 120, the image display panel 200, the surface light source device 300, the image display panel drive section 400, and a surface light source device drive section 500.

The image output section 110 outputs an input signal SRGB to the signal processing section 120. The input signal SRGB includes an input signal value $x1_{(p,q)}$ for a first primary color, an input signal value $x2_{(p,q)}$ for a second primary color, and an input signal value $x3_{(p,q)}$ for a third primary color. In the second embodiment it is assumed that the first primary color is red, that the second primary color is green, and that the third primary color is blue.

The signal processing section 120 is connected to the image display panel drive section 400 which drives the image display panel 200, and is connected to the surface light source device drive section 500 which drives the surface light source device 300. The signal processing section 120 division-controls the luminance of the surface light source device 300 by blocks. Furthermore, the signal processing section 120 calculates luminance information for the surface light source device 300 by pixels, makes an output signal SRGBW reflect the luminance information, and controls image display. In addition to an output signal value $X1_{(p,q)}$ corresponding to a first subpixel, an output signal value $X2_{(p,q)}$ corresponding to a second subpixel, and an output signal value $X3_{(p,q)}$ corresponding to a third subpixel, the output signal SRGBW includes an output signal value $X4_{(p,q)}$ corresponding to a fourth subpixel which displays a fourth color. In the second embodiment it is assumed that the fourth color is white.

The image display panel 200 is made up of (P×Q) pixels 201 arranged like a two-dimensional matrix.

The image display panel drive section 400 includes the signal output circuit 410 and the scanning circuit 420 and drives the image display panel 200.

The surface light source device 300 is disposed on the back side of the image display panel 200 and emits light to the image display panel 200.

The surface light source device drive section 500 includes a light source drive circuit 510 and a light modulation drive circuit 520. On the basis of a light source control signal SBL outputted from the signal processing section 120, the light source drive circuit 510 controls incident light emitted from the sidelight light source 302 of the surface light source device 300 and the light modulation drive circuit 520 controls the magnitude of voltage (or a duty ratio or a frequency) applied to the upper electrode 312 and the lower electrode 318. By doing so, luminance (intensity of light) at the emission surface of the surface light source device 300 (light modulation element 310) is controlled.

The processing operation of the signal processing section 120 is realized by the display driver IC 100b and the LED driver IC 100c or the CPU 100a1 illustrated in FIG. 2.

If the processing operation of the signal processing section 120 is realized by the display driver IC 100b, then an input signal SRGB is inputted to the display driver IC 100b and the LED driver IC 100c via the CPU 100a1. The display driver IC 100b generates an output signal SRGBW and controls the image display panel 200. In addition, the display driver IC 100b generates a light source control signal SBL and outputs it to the LED driver IC 100c via the bus 100f.

If the processing operation of the signal processing section 120 is realized by the CPU 100a1, then an output signal SRGBW is inputted from the CPU 100a1 to the display driver IC 100b. A light source control signal SBL is also generated by the CPU 100a1 and is outputted to the LED driver IC 100c via the bus 100f.

An example of the structure of functions which the signal processing section 120 of the display device 100 further has will now be described by the use of FIG. 9.

Figure 9:
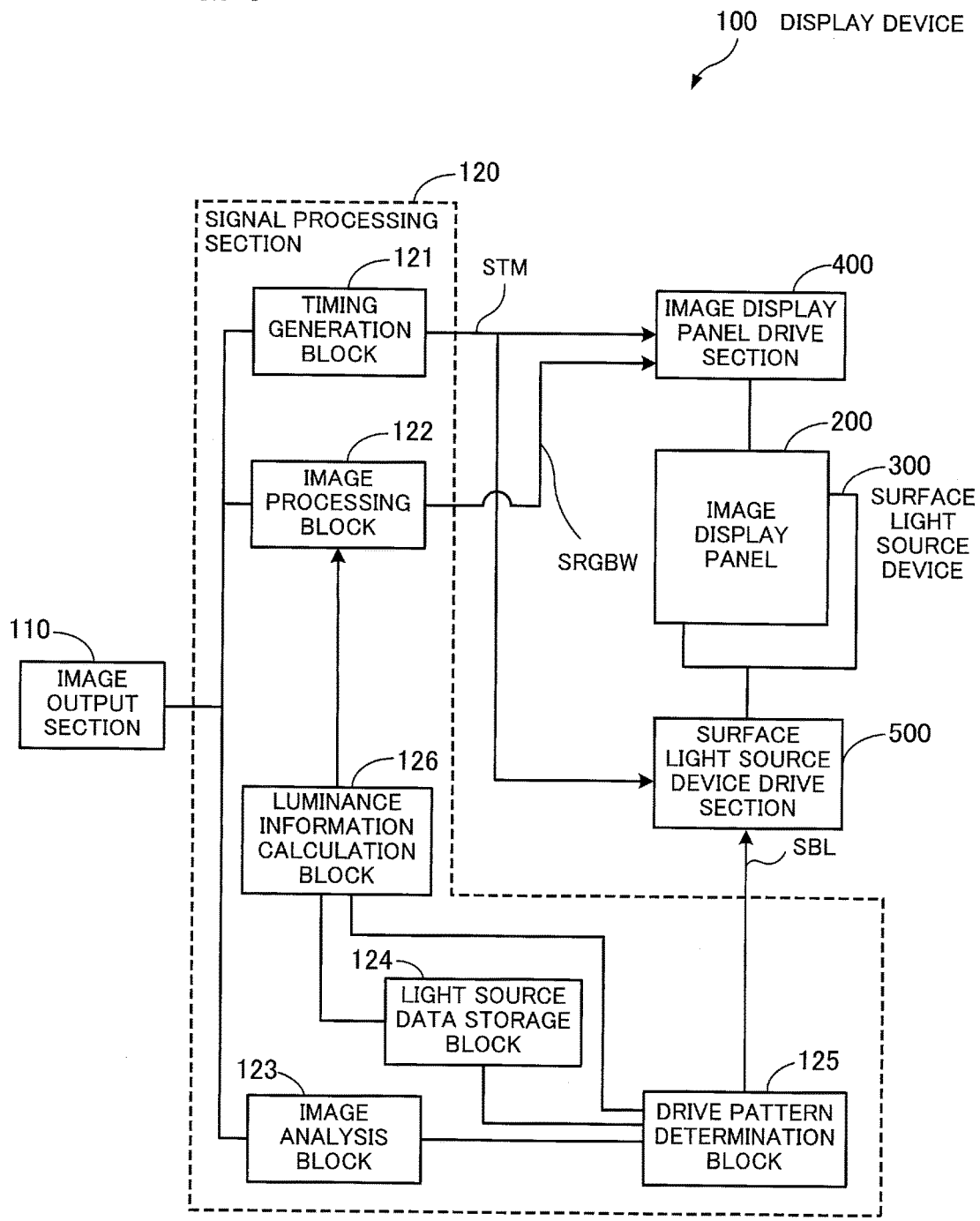
FIG. 9 illustrates an example of the structure of the functions of a signal processing section included in the display device according to the second embodiment.

FIG. 9 illustrates an example of the structure of the functions of the signal processing section included in the display device according to the second embodiment.

The signal processing section 120 includes a timing generation block 121, an image processing block 122, an image analysis block 123, a light source data storage block 124, a drive pattern determination block 125, and a luminance information calculation block 126. An input signal SRGB is inputted from the image output section 110 to the signal processing section 120. The input signal SRGB includes color information on an image displayed at the position of each pixel 201 of the image display panel 200.

The timing generation block 121 generates a synchronization signal STM for synchronizing the operation timing of the image display panel drive section 400 with that of the surface light source device drive section 500 every image display frame. The timing generation block 121 outputs the generated synchronization signal STM to the image display panel drive section 400 and the surface light source device drive section 500.

The image processing block 122 generates an output signal SRGBW on the basis of the input signal SRGB and luminance information by pixels for the surface light source device 300 inputted from the luminance information calculation block 126.

On the basis of the input signal SRGB, the image analysis block 123 calculates a required luminance value of the surface light source device 300 required for each of blocks obtained by dividing a display surface of the image display panel 200. Each pixel 201 includes the fourth subpixel 202W, so its luminance can be adjusted (converted). A conversion coefficient for converting the luminance of each pixel 201 is determined according to the input signal SRGB. With division drive control of the surface light source device 300, the luminance of each pixel 201 is converted and the luminance of the surface light source device 300 is reduced according to an increase in the luminance of each pixel 201. That is to say, there is a correspondence between a conversion coefficient for converting the luminance of each pixel 201 and a conversion coefficient for converting the luminance of the surface light source device 300. The image analysis block 123 analyzes the input signal SRGB corresponding to each block, calculates a block correspondence conversion coefficient for converting the luminance of the surface light source device 300 by blocks, and determines a required luminance value of each block. For example, the image analysis block 123 calculates a block correspondence conversion coefficient on the basis of at least one of saturation and a value of the input signal SRGB corresponding to each block. A concrete example of a required luminance value will be described later.

The light source data storage block 124 stores luminance distribution information on the light sources 303. The light sources 303 differ in luminance distribution. Accordingly, the light source data storage block 124 stores as luminance distribution information a luminance value of the entire surface of the surface light source device 300 detected at the time of lighting each light source 303 at a determined lighting amount. The luminance distribution information indicates a luminance value of the surface light source device 300 detected for each of (m×n) areas (m is any integer which satisfies 1≤m≤P and n is any integer which satisfies 1≤n≤Q) obtained by dividing the display surface of the image display panel 200 (or the emission surface of the surface light source device 300). The number of areas obtained by division is set to any number, but it does not exceed the number of pixels. If each area obtained by division corresponds to one pixel, then luminance values by pixels are stored as the luminance distribution information. If each area obtained by division corresponds to more than one pixel, then a pixel at a determined position in each area is considered as a representative pixel and a luminance value of the surface light source device 300 at the representative pixel is stored. The light source data storage block 124 stores luminance distribution information (lookup tables by light sources) in which luminance values of (m×n) areas are set for each light source 303 in a tabular form. The lookup tables by light sources are information specific to the display device 100, so they are created in advance and are stored in the light source data storage block 124.

The drive pattern determination block 125 determines a lighting pattern of the sidelight light source 302 on the basis of a required luminance value of each block calculated by the image analysis block 123 and the lookup tables by light sources stored in the light source data storage block 124. The drive pattern determination block 125 may find a lighting pattern of the sidelight light source 302 by calculation. Furthermore, the drive pattern determination block 125 determines an application pattern of voltage to be applied to an upper electrode 312 and a lower electrode 318 of the light modulation element 310 on the basis of a required luminance value of each block calculated by the image analysis block 123 and a lighting pattern of the sidelight light source 302. An application pattern is calculated and determined so that a required luminance value calculated will be obtained by light emitted from the surface light source device 300 according to light emitted from the sidelight light source 302 on the basis of a determined lighting pattern. An example of drive patterns including a lighting pattern of each light source 303 and an application pattern of voltage to be applied to an upper electrode 312 and a lower electrode 318 of the light modulation element 310 will be described later.

The luminance information calculation block 126 uses a lighting pattern and the lookup tables by light sources stored in the light source data storage block 124 for calculating luminance information by pixels on the surface light source device 300 driven according to the lighting pattern. First the luminance information calculation block 126 uses the lookup tables by light sources for calculating drive-time luminance distribution information by light sources at the time of lighting the sidelight light source 302 according to the lighting pattern and driving the light modulation element 310 according to an application pattern. If information by pixels is not obtained from the lookup tables by light sources, then the luminance information calculation block 126 performs interpolation calculation for calculating drive-time luminance distribution information by light sources. The luminance information calculation block 126 then combines the drive-time luminance distribution information by light sources for finding drive-time luminance distribution information on the sidelight light source 302, and outputs it to the image processing block 122. Luminance values of the surface light source device 300 are set by pixels in the calculated drive-time luminance distribution information on the sidelight light source 302.

A process performed by the image processing block 122 which acquires the drive-time luminance distribution information from the luminance information calculation block 126 will be described. The image processing block 122 obtains luminance values by pixels of the surface light source device 300 from the drive-time luminance distribution information. As stated above, the luminance of the surface light source device 300 is calculated by a conversion coefficient for reducing (converting) the luminance. In addition, when there is a determined correspondence between the conversion coefficient for reducing the luminance and a conversion coefficient for increasing (converting) the luminance of each pixel, display is performed with proper luminance. The image processing block 122 calculates from the luminance values by pixels of the surface light source device 300 a first pixel correspondence conversion coefficient for reducing the luminance of the surface light source device 300. Furthermore, the image processing block 122 calculates a second pixel correspondence conversion coefficient for increasing the luminance of each pixel which corresponds to the first pixel correspondence conversion coefficient, and generates an output signal SRGBW by the use of the second pixel correspondence conversion coefficient.

A case where an expansion coefficient α is used as an embodiment of the conversion coefficient for increasing the luminance of each pixel or the conversion coefficient for reducing the luminance of the surface light source device 300 will now be described by the use of FIG. 10.

Figure 10:
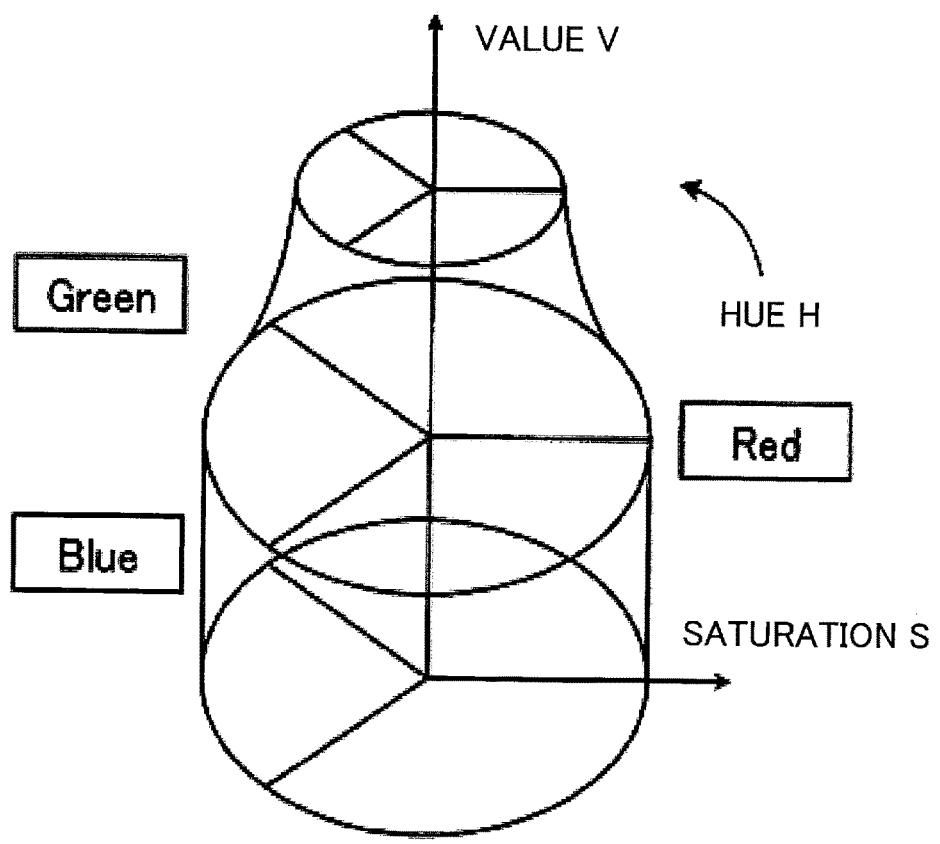
FIG. 10 is a schematic view of reproduction HSV color space which can be reproduced by the display device according to the second embodiment.

FIG. 10 is a schematic view of reproduction HSV color space which can be reproduced by the display device according to the second embodiment.

Each pixel 201 of the display device 100 includes the fourth subpixel 202W which outputs the fourth color (white). This extends the dynamic range of a value in reproduction HSV color space which can be reproduced by the display device 100. "H" represents hue, "S" represents saturation, and "V" represents a value.

As illustrated in FIG. 10, the reproduction HSV color space to which the fourth color has been added has a shape obtained by putting an approximately trapezoid solid in which, as the saturation S increases, the maximum value of the value V becomes smaller on cylindrical HSV color space which the first subpixel 202R, the second subpixel 202G, and the third subpixel 202B display. The signal processing section 120 stores the maximum value Vmax(S) of the value V expressed with the saturation S in the reproduction HSV color space which has been extended by adding the fourth color as a variable. That is to say, the signal processing section 120 stores the maximum value Vmax(S) of the value V by the coordinates (values) of the saturation S and the hue H for the solid shape of the reproduction HSV color space illustrated in FIG. 10.

An input signal SRGB includes input signal values corresponding to the first, second, and third primary colors, so HSV color space of the input signal SRGB has a cylindrical shape, that is to say, has the same shape as a cylindrical portion of the reproduction HSV color space illustrated in FIG. 10 has. Accordingly, an output signal SRGBW is calculated as an expanded image signal obtained by expanding the input signal SRGB to make it fall within the reproduction HSV color space. The input signal SRGB is expanded by the use of the expansion coefficient α determined by comparing the value levels corresponding to subpixels of the input signal SRGB in the reproduction HSV color space. By expanding the level of the input signal SRGB by the use of the expansion coefficient α, an output signal value corresponding to the fourth subpixel 202W can be made large. This increases the luminance of an entire image. At this time the luminance of the surface light source device 300 is reduced to 1/α according to an increase in the luminance of the entire image caused by the use of the expansion coefficient α. By doing so, display is performed with exactly the same luminance as with the input signal SRGB.

The expansion of an input signal SRGB will now be described.

In the signal processing section 120, an output signal value $X1_{(p, q)}$ corresponding to the first subpixel 202R, an output signal value $X2_{(p, q)}$ corresponding to the second subpixel 202G, and an output signal value $X3_{(p, q)}$ corresponding to the third subpixel 202B for a (p, q)th pixel (or a combination of the first subpixel 202R, the second subpixel 202G, and the third subpixel 202B) are expressed as:

$$X1_{(p,q)} = \alpha \cdot x1_{(p,q)} - \chi \cdot X4_{(p,q)} \quad (1)$$

$$X2_{(p,q)} = \alpha \cdot x2_{(p,q)} - \chi \cdot X4_{(p,q)} \quad (2)$$

$$X3_{(p,q)} = \alpha \cdot x3_{(p,q)} - \chi \cdot X4_{(p,q)} \quad (3)$$

where α is an expansion coefficient and χ is a constant which depends on the display device 100. χ will be described later.

In addition, an output signal value $X4_{(p, q)}$ is calculated on the basis of the product of $Min_{(p, q)}$ and the expansion coefficient α, where $Min_{(p, q)}$ is the minimum value of an input signal value $x1_{(p, q)}$ corresponding to the first subpixel 202R, an input signal value $x2_{(p, q)}$ corresponding to the second subpixel 202G, and an input signal value $x3_{(p, q)}$ corresponding to the third subpixel 202B. To be concrete, an output signal value $X4_{(p, q)}$ is found on the basis of $$X4_{(p,q)} = Min_{(p,q)} \cdot \alpha / \chi \quad (4)$$

In expression (4), the product of $Min_{(p, q)}$ and the expansion coefficient α is divided by χ. However, another calculation method may be adopted. Furthermore, the expansion coefficient α is determined every image display frame.

These points will now be described.

On the basis of an input signal SRGB for a (p, q)th pixel including an input signal value $x1_{(p, q)}$ corresponding to the first subpixel 202R, an input signal value $x2_{(p, q)}$ corresponding to the second subpixel 202G, and an input signal value $x3_{(p, q)}$ corresponding to the third subpixel 202B, usually saturation $S_{(p, q)}$ and value $V(S)_{(p, q)}$ in the cylindrical HSV color space are found from $$S_{(p,q)} = (Max_{(p,q)} - Min_{(p,q)}) / Max_{(p,q)} \quad (5)$$

$$V(S)_{(p,q)} = Max_{(p,q)} \quad (6)$$

where $Max_{(p, q)}$ is the maximum value of the input signal value $x1_{(p, q)}$ corresponding to the first subpixel 202R, the input signal value $x2_{(p, q)}$ corresponding to the second subpixel 202G, and the input signal value $x3_{(p, q)}$ corresponding to the third subpixel 202B, $Min_{(p, q)}$, as stated above, is the minimum value of the input signal value $x1_{(p, q)}$ corresponding to the first subpixel 202R, the input signal value $x2_{(p, q)}$ corresponding to the second subpixel 202G, and the input signal value $x3_{(p, q)}$ corresponding to the third subpixel 49B, the saturation S has a value in the range of 0 to 1, and the value V(S) has a value in the range of 0 to $(2^n-1)$, where n is a display gradation bit number.

A color filter is not disposed between the fourth subpixel 202W which displays white and an observer of an image. If the first subpixel 202R which displays the first primary color, the second subpixel 202G which displays the second primary color, the third subpixel 202B which displays the third primary color, and the fourth subpixel 202W which displays the fourth color are lighted at the same light source lighting amount, then the fourth subpixel 202W is brighter than the first subpixel 202R, the second subpixel 202G, and the third subpixel 202B. It is assumed that when a signal value corresponding to the maximum value of output signal values corresponding to the first subpixels 202R is inputted to a first subpixel 202R, a signal value corresponding to the maximum value of output signal values corresponding to the second subpixels 202G is inputted to a second subpixel 202G, and a signal value corresponding to the maximum value of output signal values corresponding to the third subpixels 202B is inputted to a third subpixel 202B, the luminance of a set of a first subpixel 202R, a second subpixel 202G, and a third subpixel 202B included in each pixel 201 or the luminance of a set of first subpixels 202R, second subpixels 202G, and third subpixels 202B included in a group of pixels 201 is $BN_{1-3}$. Furthermore, it is assumed that when a signal value corresponding to the maximum value of output signal values corresponding to a fourth subpixel 202W included in each pixel 201 or fourth subpixels 202W included in a group of pixels 201 is inputted to a fourth subpixel 202W, the luminance of the fourth subpixel 202W is $BN_4$. That is to say, white which has the maximum luminance is displayed by a set of a first subpixel 202R, a second subpixel 202G, and a third subpixel 202B and the luminance of white is $BN_{1-3}$. As a result, the constant χ which depends on the display device 100 is expressed as $$\chi = BN_4 / BN_{1-3}$$

By the way, if the output signal value $X4_{(p, q)}$ is given by the above expression (4), the maximum value Vmax(S) of a value is expressed, with the saturation S in the reproduction HSV color space as a variable, as:

If $S \leq S_0$, then $$V\max(S) = (\chi + 1) \cdot (2^n - 1) \quad (7)$$

If $S_0 < S \leq 1$, then $$V\max(S) = (2^b - 1) \cdot (1/S) \quad (8)$$

where $S_0 = 1/(\chi + 1)$.

The maximum value Vmax(S) of the value V which is expressed with the saturation S in the reproduction HSV color space that has been extended by adding the fourth color as a variable and which is obtained in this way is stored in, for example, the signal processing section 120 as a type of lookup table. Alternatively, the maximum value Vmax(S) of the value V expressed with the saturation S in the reproduction HSV color space as a variable is found every time by the signal processing section 120.

The expansion coefficient α is used for expanding the value V(S) in the HSV color space into the reproduction HSV color space and is expressed as $$\alpha(S) = V\max(S) / V(S) \quad (9)$$

In expansion calculation, the expansion coefficient α is determined on the basis of, for example, α(S) found for plural pixels 201.

Signal processing performed by the signal processing section 120 by the use of the expansion coefficient α will now be described. The following signal processing is performed so that the ratio among the luminance of the first primary color displayed by (first subpixel 202R+fourth subpixel 202W), the luminance of the second primary color displayed by (second subpixel 202G+fourth subpixel 202W), and the luminance of the third primary color displayed by (third subpixel 202B+fourth subpixel 202W) will be held, so that a color tone will be held (maintained), and so that a gradation-luminance characteristic (gamma (γ) characteristic) will be held (maintained). Furthermore, if all input signal values are 0 or small for a pixel 201 or a group of pixels 201, then the expansion coefficient α may be calculated with the pixel 201 or the group of pixels 201 excluded.

A process performed by the image analysis block 123 will be described. On the basis of an input signal SRGB for plural pixels 201 included in a block, the image analysis block 123 finds the saturation S and the value V(S) of the plural pixels 201. To be concrete, the image analysis block 123 uses an input signal value $x1_{(p, q)}$, an input signal value $x2_{(p, q)}$, and an input signal value $x3_{(p, q)}$ for a (p, q)th pixel 201 and finds $S_{(p, q)}$ and $V(S)_{(p, q)}$ from expressions (5) and (6) respectively. The image analysis block 123 performs this process on all pixels in the block. As a result, combinations of ($S_{(p, q)}$, $V(S)_{(p, q)}$) the number of which corresponds to the number of pixels 201 in the block are obtained. Next, the image analysis block 123 finds the expansion coefficient α on the basis of at least one of α(S) values found for the pixels 201 in the block. For example, the image analysis block 123 considers the smallest value of the α(S) values found for the pixels 201 in the block as the expansion coefficient α for the block. The image analysis block 123 calculates the expansion coefficient α for the block in this way.

The image analysis block 123 repeats this procedure by blocks and calculates the expansion coefficient α for each block. Luminance required for a block is calculated by the use of 1/α which is the reciprocal of the expansion coefficient α. 1/α is an example of a block correspondence conversion coefficient.

The signal processing section 120 (image analysis block 123) analyzes an input signal SRGB, uses the expansion coefficient α to calculate a block correspondence conversion coefficient for converting the luminance of the surface light source device 300 by blocks, and determines a required luminance value of each block. A concrete example of the required luminance value will now be described by the use of FIGS. 11A through 11C.

FIGS. 11A, 11B, and 11C illustrate examples of required luminance values according to blocks of the surface light source device included in the display device according to the second embodiment.

FIG. 11A indicates a case where an arbitrary required luminance value is associated with each block of the emission surface of the surface light source device 300. FIG. 11B indicates a case where the same required luminance value is associated with each block of the emission surface of the surface light source device 300. FIG. 11C indicates a case where required luminance values are associated with part of the blocks of the emission surface of the surface light source device 300.

Information regarding a required luminance value of each of, for example, 36 (=6×6) blocks into which the emission surface of the surface light source device 300 is divided is set in required luminance value information 124a (it is assumed that the sidelight light source 302 is disposed on the side of the blocks corresponding to N=1 and that the sidelight light source 302 emits light in the direction of from the blocks corresponding to N=1 to the blocks corresponding to N=6.) Information regarding a required luminance value may be the expansion coefficient α calculated for each block, 1/α, a luminance value after conversion, or the like.

As illustrated in FIG. 11B, in order to emit light uniformly from the entire emission surface of the surface light source device 300, required luminance values of the blocks are set uniformly.

Furthermore, as illustrated in FIG. 11C, in order to emit light from part of the emission surface of the surface light source device 300, required luminance values are set only for blocks which are expected to emit light and 0 is set as required luminance values for blocks which do not emit light.

As stated above, FIGS. 11A, 11B, and 11C illustrate examples of required luminance values and the number of blocks into which the emission surface of the surface light source device 300 is divided is not limited to the above number. The number of blocks into which the emission surface of the surface light source device 300 is divided is selected arbitrarily.

An example of a drive pattern (lighting pattern and application pattern) determined by the drive pattern determination block 125 will now be described.

First two drive patterns adopted in a case (corresponding to FIG. 11B) where light is emitted uniformly from the emission surface of the surface light source device 300 (light modulation element 310) will be described by the use of FIGS. 12A and 12B.

Figure 12A:
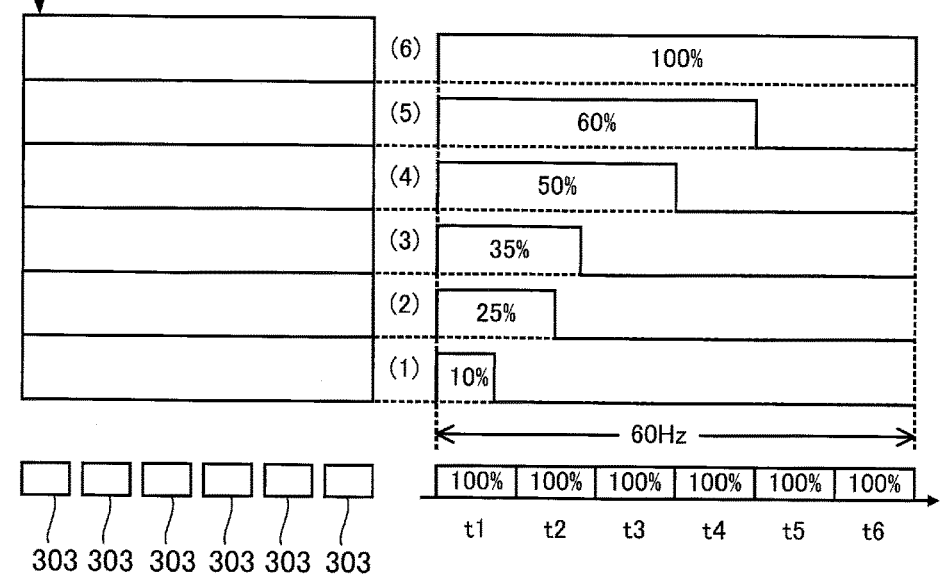
FIGS. 12A and 12B illustrate drive patterns (uniform) of the surface light source device at the time of a display process being performed by the signal processing section included in the display device according to the second embodiment.
Figure 12B:
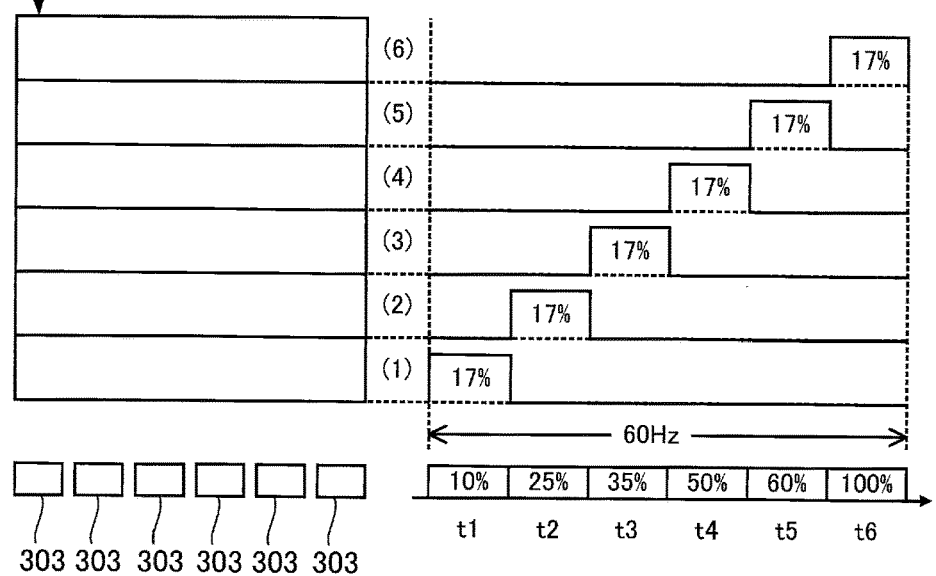

FIGS. 12A and 12B illustrate drive patterns (uniform) of the surface light source device at the time of a display process being performed by the signal processing section included in the display device according to the second embodiment.

FIG. 12A indicates a case where the light emission power of each light source 303 is not changed regardless of the passage of time. FIG. 12B indicates a case where the light emission power of each light source 303 is changed with the passage of time. The surface light source device 300 (light modulation element 310) whose emission surface is divided into 6 oblong areas (1) through (6) is schematically illustrated as an example on the left side of each of FIGS. 12A and 12B. Area (1) includes the blocks corresponding to N=1 (M=1 to 6) in FIGS. 11A through 11C. Similarly, areas (2) through (6) include the blocks corresponding to N=2 to 6 (M=1 to 6), respectively, in FIGS. 11A through 11C. Furthermore, figures represented in percentages in the lower part on the right side of each of FIGS. 12A and 12B indicate a change in the light emission power (lighting pattern) of the sidelight light source 302 (light sources 303) with the passage of time in one image display frame (60 Hz, for example). Figures represented in percentages in the upper part on the right side of each of FIGS. 12A and 12B indicate duty ratios of voltage (application pattern) applied to upper electrodes 312 and lower electrodes 318 corresponding to areas (1) through (6) of the light modulation element 310 in one image display frame (60 Hz, for example).

The amount of incident light (blue light, for example) which is emitted from light sources 303 and which enters the surface light source device 300 from the side may be large in an area near the side and be small in an area distant from the side. As a result, light may not be emitted uniformly from the emission surface of the surface light source device 300.

Accordingly, first the drive pattern determination block 125 determines a lighting pattern on the basis of required luminance values (3.0 (FIG. 11B)) of areas (1) through (6) calculated by the image analysis block 123 and the lookup tables by light sources stored in the light source data storage block 124 so that, as illustrated in FIG. 12A, for example, the light emission power of the sidelight light source 302 (all the light sources 303) will be constant (100%) regardless of the passage of time.

Furthermore, the drive pattern determination block 125 determines an application pattern of voltage applied to upper electrodes 312 and lower electrodes 318 corresponding to areas (1) through (6) of the light modulation element 310 so that when all the light sources 303 emit light on the basis of the determined lighting pattern, areas (1) through (6) will realize the calculated required luminance values. For example, voltage (duty ratios) applied to the upper electrodes 312 and the lower electrodes 318 corresponding to areas (1) through (6) of the light modulation element 310 is set to 10%, 25%, 35%, 50%, 60%, and 100%, respectively, in this application pattern.

Alternatively, the drive pattern determination block 125 may determine a drive pattern in the following way for emitting light uniformly from the emission surface of the surface light source device 300 (light modulation element 310).

The drive pattern determination block 125 determines a lighting pattern on the basis of required luminance values of areas (1) through (6) calculated by the image analysis block 123 and the lookup tables by light sources stored in the light source data storage block 124 so that, as illustrated in FIG. 12B, for example, the light emission power of all the light sources 303 will increase (10% for t1, 25% for t2, 35% for t3, 50% for t4, 60% for t5, and 100% for t6) with the passage of time in each image display frame.

Furthermore, the drive pattern determination block 125 determines an application pattern of voltage applied to upper electrodes 312 and lower electrodes 318 corresponding to areas (1) through (6) of the light modulation element 310 so that when all the light sources 303 emit light on the basis of the determined lighting pattern, areas (1) through (6) will realize the calculated required luminance values. This is the same with FIG. 12A. In this application pattern, as illustrated in FIG. 12B, for example, voltage (duty ratios) applied to the upper electrodes 312 and the lower electrodes 318 corresponding to areas (1) through (6) of the light modulation element 310 is set to a constant value (17%, for example) in one image display frame (60 Hz, for example) regardless of the passage of time.

By using a drive pattern including a lighting pattern and an application pattern determined in this way by the drive pattern determination block 125, each area of the surface light source device 300 (light modulation element 310) realizes a calculated required luminance value and emits light. As a result, the emission surface (areas (1) through (6)) uniformly emits light. The description of a case where the light emission power of the light sources 303 is constant and where a duty ratio of voltage applied to the light modulation element 310 is changed and a case where a duty ratio of voltage applied to the light modulation element 310 is constant and where the light emission power of the light sources 303 is changed with the passage of time has been given. However, it is also possible to not only change a duty ratio of voltage applied to the light modulation element 310 but also change the light emission power of the light sources 303, with the passage of time.

Next, two drive patterns adopted in a case (corresponding to FIG. 11C) where light is emitted from part of the emission surface of the surface light source device 300 (light modulation element 310) will be described as another example of a drive pattern determined by the drive pattern determination block 125 by the use of FIGS. 13A and 13B.

Figure 13A:
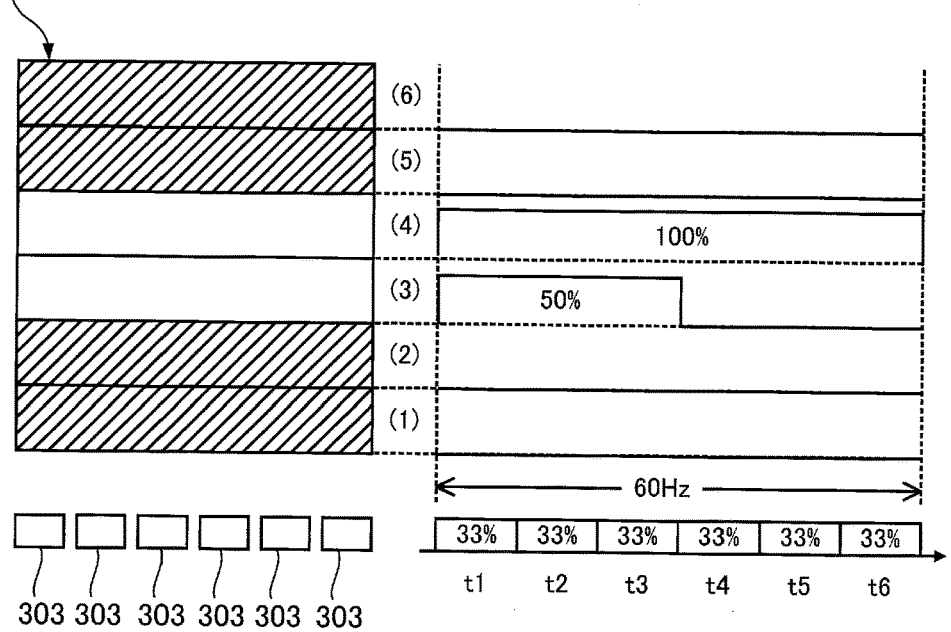
FIGS. 13A and 13B illustrate drive patterns (partial drive) of the surface light source device at the time of a display process being performed by the signal processing section included in the display device according to the second embodiment.
Figure 13B:
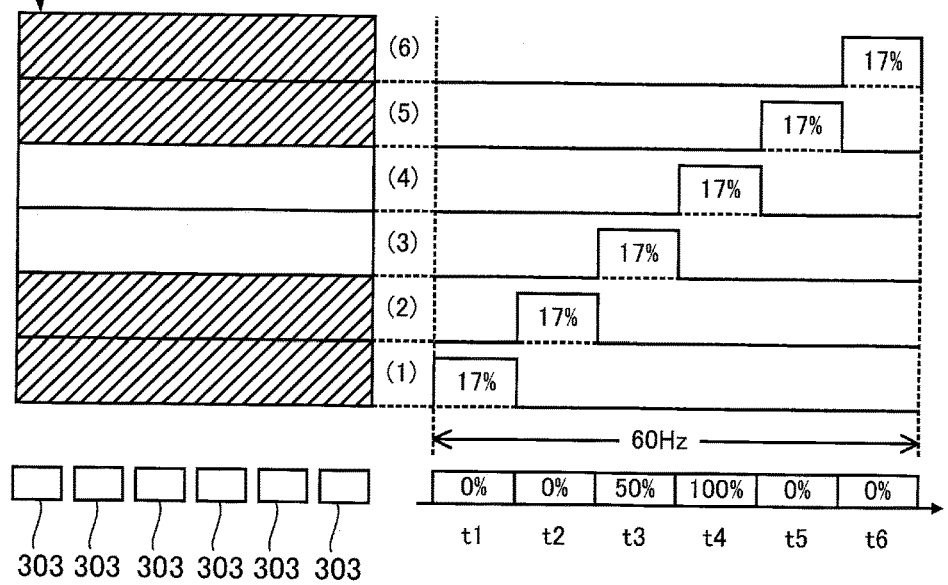

FIGS. 13A and 13B illustrate drive patterns (partial drive) of the surface light source device at the time of a display process being performed by the signal processing section included in the display device according to the second embodiment.

FIG. 13A indicates a case where the light emission power of the sidelight light source 302 (light sources 303) is not changed regardless of the passage of time. This is the same with FIG. 12A. FIG. 13B indicates a case where the light emission power of the sidelight light source 302 (light sources 303) is changed with the passage of time. This is the same with FIG. 12B. As with FIGS. 12A and 12B, each of FIGS. 13A and 13B indicates a change in the light emission power of the sidelight light source 302 with the passage of time in one image display frame (60 Hz, for example) (figures represented in percentages in the lower part on the right side) and indicates duty ratios of voltage applied to upper electrodes 312 and lower electrodes 318 corresponding to areas (1) through (6) of the light modulation element 310 in one image display frame (60 Hz, for example) (figures represented in percentages in the upper part on the right side). A state in which light is emitted from part (areas (3) and (4)) of the emission surface of the surface light source device 300 and in which light is not emitted from the other areas (1), (2), (5), and (6) of the emission surface of the surface light source device 300 is indicated especially on the left side of FIGS. 13A and 13B.

As described in FIGS. 12A and 12B, even if light is emitted from part of the emission surface of the surface light source device 300, the amount of incident light (monochromatic light such as blue light) which is emitted from light sources 303 and which enters the surface light source device 300 from the side may be large in an area near the side and be small in an area distant from the side. As a result, light may not be emitted uniformly from the part of the emission surface of the surface light source device 300.

Accordingly, first the drive pattern determination block 125 determines a lighting pattern on the basis of required luminance values (4.0 for areas (3) and (4) and 0 for the other areas (FIG. 11C)) of areas (1) through (6) calculated by the image analysis block 123 and the lookup tables by light sources stored in the light source data storage block 124 so that, as illustrated in FIG. 13A, for example, the light emission power of the sidelight light source 302 (all the light sources 303) will be constant (33%) regardless of the passage of time.

Furthermore, the drive pattern determination block 125 determines an application pattern of voltage applied to upper electrodes 312 and lower electrodes 318 corresponding to areas (1) through (6) of the light modulation element 310 so that when all the light sources 303 emit light on the basis of the determined lighting pattern, areas (1) through (6) will realize the calculated required luminance values. In this application pattern, for example, voltage (duty ratios) applied to the upper electrodes 312 and the lower electrodes 318 corresponding to areas (3) and (4) of the light modulation element 310 is set to 50% and 100%, respectively, and voltage (duty ratios) applied to the upper electrodes 312 and the lower electrodes 318 corresponding to areas (1), (2), (5), and (6) of the light modulation element 310 is set to 0%.

Alternatively, the drive pattern determination block 125 may determine a drive pattern in the following way for emitting light uniformly from part of the emission surface of the surface light source device 300 (light modulation element 310).

The drive pattern determination block 125 determines a lighting pattern on the basis of required luminance values of areas (1) through (6) calculated by the image analysis block 123 and the lookup tables by light sources stored in the light source data storage block 124 so that, as illustrated in FIG. 13B, for example, the light emission power of all the light sources 303 will increase (0% for t1 and t2, 50% for t3, 100% for t4, and 0% for t5 and t6) with the passage of time in each image display frame. From the viewpoint of a reduction in drive power, it is desirable to set voltage applied to the light modulation element 310 to 0 when the light emission power is 0%, that is to say, for t1, t2, t5, and t6. Furthermore, if the light sources 303 light in this way not continuously but intermittently, the amount of power supplied for a lighting period is increased. By doing so, higher luminance is obtained.

Furthermore, the drive pattern determination block 125 determines an application pattern of voltage applied to upper electrodes 312 and lower electrodes 318 corresponding to areas (1) through (6) of the light modulation element 310 so that when all the light sources 303 emit light on the basis of the determined lighting pattern, areas (1) through (6) will realize the calculated required luminance values. This is the same with FIG. 13A. In this application pattern, as illustrated in FIG. 13B, for example, voltage (duty ratios) applied to the upper electrodes 312 and the lower electrodes 318 corresponding to areas (1) through (6) of the light modulation element 310 is set to a constant value (17%, for example) in one image display frame (60 Hz, for example) regardless of the passage of time.

By using a drive pattern including a lighting pattern and an application pattern determined in this way by the drive pattern determination block 125, each area of the surface light source device 300 (light modulation element 310) realizes a calculated required luminance value and emits light. As a result, part of the emission surface (areas (3) and (4)) uniformly emits light.

Furthermore, the drive pattern determination block 125 determines two drive patterns like those described in FIGS. 12A and 12B or FIGS. 13A and 13B by a method set in advance.

Signal processing performed by the signal processing section 120 having the above functions will now be described by the use of FIG. 14.

Figure 14:
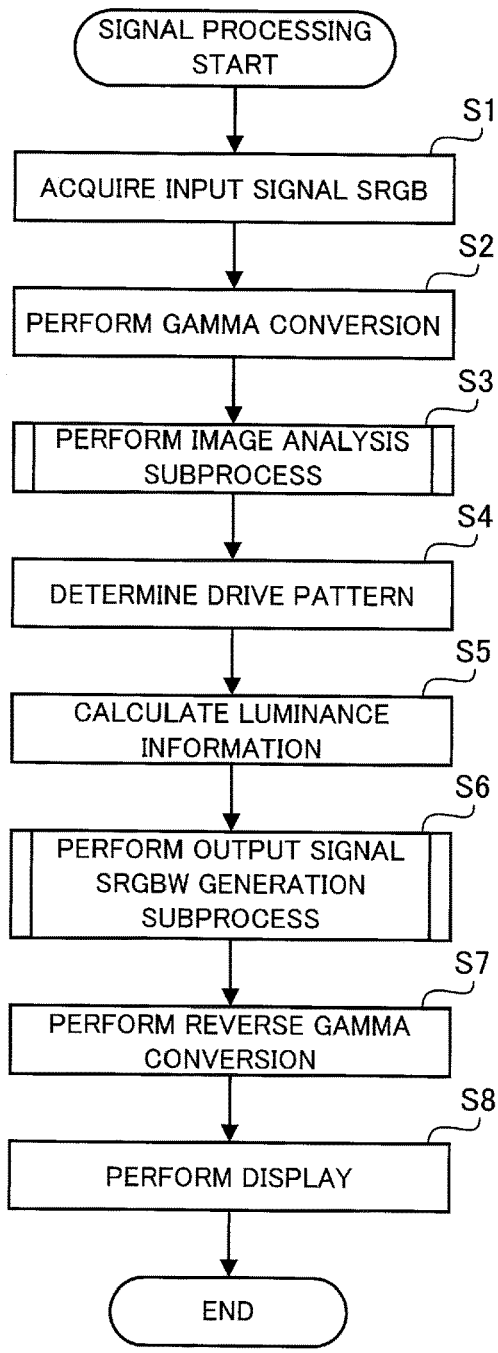
FIG. 14 is a flow chart of signal processing performed by the signal processing section included in the display device according to the second embodiment.

FIG. 14 is a flow chart of signal processing performed by the signal processing section included in the display device according to the second embodiment.

The display device 100 starts a process every image display frame. An input signal SRGB is inputted via the image output section 110 to the signal processing section 120.

(Step S1) The signal processing section 120 acquires the input signal SRGB.

(Step S2) The signal processing section 120 gamma-converts the input signal SRGB to linearize it.

(Step S3) The image analysis block 123 acquires the linearized input signal SRGB and performs an image analysis subprocess. In the image analysis subprocess, the image analysis block 123 calculates a required luminance value of the surface light source device 300 on the basis of the input signal SRGB for each of blocks obtained by dividing the display surface of the image display panel 200. The details of the image analysis subprocess will be described later.

(Step S4) The drive pattern determination block 125 acquires a required luminance value for each block, refers to the lookup tables by light sources stored in the light source data storage block 124, and determines a lighting pattern of the sidelight light source 302.

In addition, the drive pattern determination block 125 determines an application pattern of voltage applied to the upper electrodes 312 and the lower electrodes 318 of the light modulation element 310 on the basis of the determined lighting pattern so that each block will realize the required luminance value acquired.

The drive pattern determination block 125 outputs to the surface light source device drive section 500 a light source control signal SBL corresponding to a drive pattern including the lighting pattern and the application pattern.

(Step S5) On the basis of the lookup tables by light sources, the luminance information calculation block 126 generates drive-time luminance distribution information at the time of driving the sidelight light source 302 according to the determined lighting pattern. The generated drive-time luminance distribution information includes luminance information by pixels on the surface light source device 300.

(Step S6) The image processing block 122 generates from the input signal SRGB output signals SRGBW by pixels. In the output signal SRGBW generation subprocess, output signals SRGBW by pixels in which corresponding luminance information on the surface light source device 300 is reflected are generated from the input signal SRGB. The details of the output signal SRGBW generation subprocess will be described later.

(Step S7) The signal processing section 120 performs reverse gamma conversion on the output signals SRGBW and outputs them to the image display panel drive section 400.

(Step S8) The signal processing section 120 performs display. In synchronization with a synchronization signal STM generated by the timing generation block 121, the image display panel drive section 400 outputs the output signals SRGBW to the image display panel 200.

In addition, the surface light source device drive section 500 drives the sidelight light source 302 and the light modulation element 310 of the surface light source device 300 on the basis of the drive pattern (step S4).

By performing the above process, an image of the input signal SRGB is reproduced on the image display panel 200. The luminance of the surface light source device 300 which lights the image display panel 200 is controlled by blocks according to the input signal SRGB. This reduces the luminance of the surface light source device 300 and reduces the power consumption.

With the above surface light source device 300 light emitted from the sidelight light source 302 enters. This suppresses chromaticity deviation caused by an increase in the distance from the sidelight light source 302.

Furthermore, by performing the above process, the light emission power of the sidelight light source 302 and a scattering degree in each block of an emission surface of the light modulation layer 316 are controlled so as to meet a required luminance value calculated for each block. Accordingly, the light modulation element 310 emits light whose intensity is highly uniform from the emission surface regardless of the distance from the sidelight light source 302.

The back of the image display panel 200 is irradiated with white light obtained by converting light emitted in this way with the white light conversion sheet 320. This suppresses the degradation of the image quality of an image displayed on the image display panel 200.

The details of the image analysis subprocess (step S3) performed in the above signal processing (FIG. 14) will now be described by the use of FIG. 15.

Figure 15:
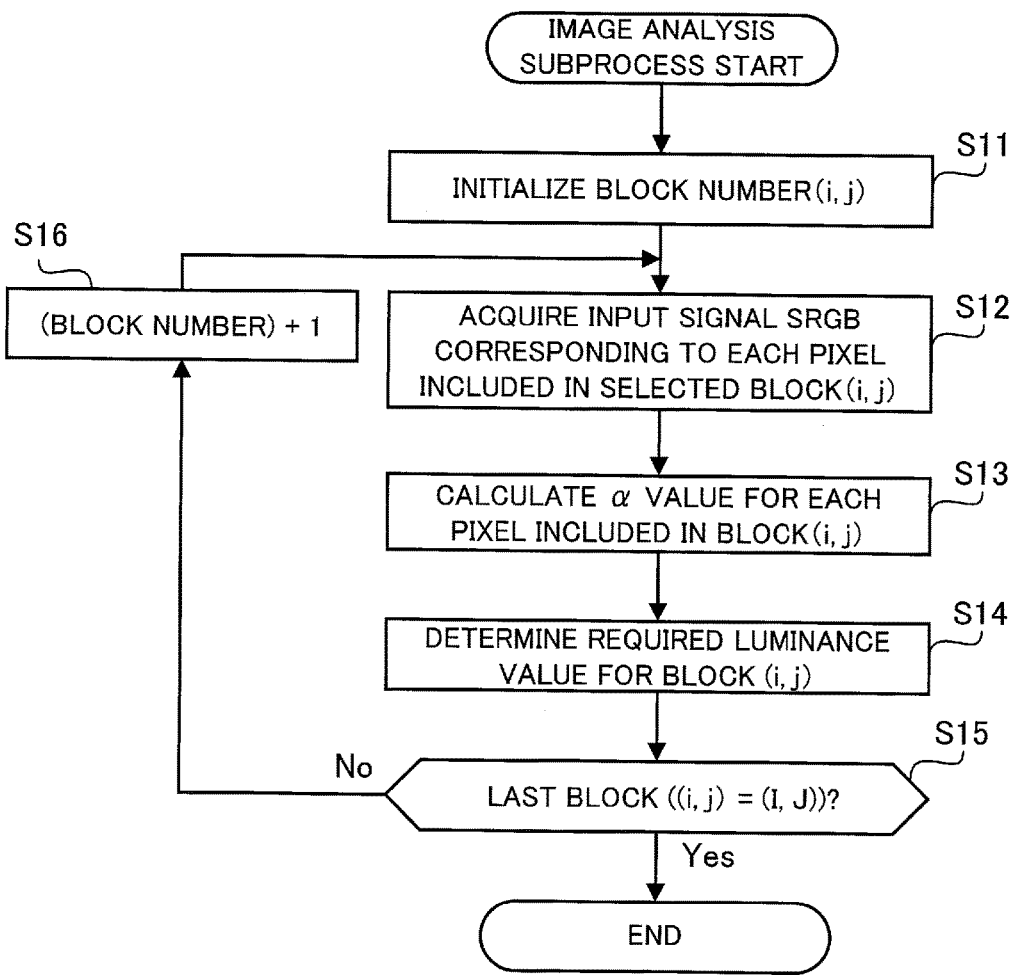
FIG. 15 is a flow chart of an image analysis subprocess performed by the signal processing section included in the display device according to the second embodiment.

FIG. 15 is a flow chart of the image analysis subprocess performed by the signal processing section included in the display device according to the second embodiment.

The image analysis block 123 acquires the input signal SRGB and starts the following subprocess. The emission surface of the surface light source device 300 is divided into (I×J) blocks.

(Step S11) The image analysis block 123 initializes a block number (i, j) by which a block to be processed is selected (block number (i, j) is (1, 1)).

(Step S12) The image analysis block 123 acquires an input signal SRGB corresponding to each pixel included in a selected block (i, j).

(Step S13) The image analysis block 123 calculates an a value for each pixel. To be concrete, the image analysis block 123 finds saturation $S_{(p, q)}$ and value $V(S)_{(p, q)}$ in the cylindrical HSV color space from an input signal SRGB corresponding to a target pixel by the use of expressions (5) and (6). The image analysis block 123 finds an a value for the pixel from the saturation $S_{(p, q)}$ and the value $V(S)_{(p, q)}$ obtained in this way by the use of expression (9). The image analysis block 123 repeats the same procedure to calculate a values for all pixels included in the block (i, j).

(Step S14) The image analysis block 123 determines a required luminance value for the block (i, j) on the basis of at least one of the α values for all the pixels. For example, the image analysis block 123 selects the smallest α value from among the α values for all the pixels included in the block (i, j), and considers the reciprocal 1/α of the smallest α value as a required luminance value for the block (i, j).

(Step S15) The image analysis block 123 compares the block number (i, j) and the last block number (I, J) and determines whether or not the block (i, j) is the last block.

If (i, j)=(I, J), then the image analysis block 123 determines that the block (i, j) is the last block. In this case, the image analysis block 123 has calculated required luminance values for all the blocks. Accordingly, the image analysis block 23 ends the image analysis subprocess. If the block (i, j) is not the last block, then the image analysis block 123 proceeds to step S16.

(Step S16) The image analysis block 123 increments the block number (i, j) by 1 and returns to step S12.

The output signal SRGBW generation subprocess (step S6) performed in the above signal processing (FIG. 14) will now be described by the use of FIG. 16.

Figure 16:
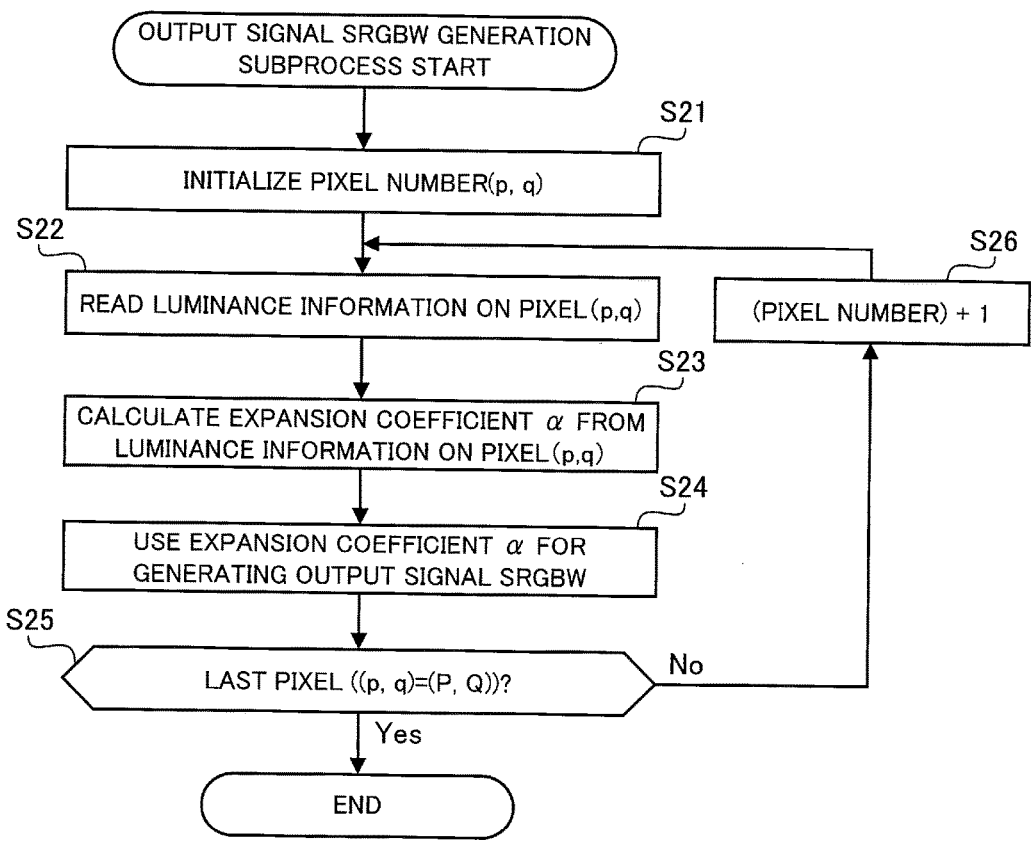
FIG. 16 is a flow chart of an output signal generation subprocess performed by the signal processing section included in the display device according to the second embodiment.

FIG. 16 is a flow chart of the output signal generation subprocess performed by the signal processing section included in the display device according to the second embodiment.

After the drive-time luminance distribution information including the luminance information by pixels on the surface light source device 300 is generated, the following subprocess is started.

(Step S21) The image processing block 122 initializes a pixel number (p, q) by which a pixel to be processed is selected (pixel number (p, q) is (1, 1)).

(Step S22) The image processing block 122 reads luminance information on a pixel (p, q) to be processed included in the drive-time luminance distribution information including the luminance information by pixels on the surface light source device 300.

(Step S23) The image processing block 122 calculates from the luminance information on the pixel (p, q) to be processed the expansion coefficient α for expanding the input signal SRGB. If the luminance of the pixel (p, q) to be processed which the surface light source device 300 irradiates with light is 1/α, then the luminance of an image is increased α-fold in order to reproduce the input signal SRGB on the display surface. Accordingly, the image processing block 122 calculates the reciprocal of the read luminance information on the pixel (p, q) to be processed as the expansion coefficient α.

(Step S24) The image processing block 122 uses the expansion coefficient α for expanding an input signal SRGB corresponding to the pixel (p, q) to be processed and generating an output signal SRGBW. To be concrete, the image processing block 122 applies expressions (1) through (4) to an input signal value $x1_{(p, q)}$ for the first subpixel 202R, an input signal value $x2_{(p, q)}$ for the second subpixel 202G, and an input signal value $x3_{(p, q)}$ for the third subpixel 202B included in the input signal SRGB to calculate an output signal value $X1_{(p, q)}$ for the first subpixel 202R, an output signal value $X2_{(p, q)}$ for the second subpixel 202G, an output signal value $X3_{(p, q)}$ for the third subpixel 202B, and an output signal value $X4_{(p, q)}$ for the fourth subpixel 202W.

(Step S25) The image processing block 122 compares the pixel number (p, q) and the last pixel number (P, Q) to determine whether or not the pixel (p, q) is the last pixel.

If (p, q) is (P, Q), then the image processing block 122 determines that the pixel (p, q) is the last pixel. In this case, output signals SRGBW for all pixels have been generated, so the image processing block 122 ends the output signal SRGBW generation subprocess. If the pixel (p, q) is not the last pixel, then the image processing block 122 proceeds to step S26.

(Step S26) The image processing block 122 increments the pixel number (p, q) by 1 and returns to step S22.

By performing the above subprocess, optimum output signals SRGBW corresponding to the luminance of the surface light source device 300 are calculated by pixels. As a result, proper display is performed.

The above processing functions can be realized with a computer. In that case, a program in which the contents of the functions that the display device has are described is provided. By executing this program on the computer, the above processing functions are realized on the computer. This program may be recorded on a computer readable record medium. A computer readable record medium may be a magnetic storage device, an optical disk, a magneto-optical recording medium, a semiconductor memory, or the like. A magnetic storage device may be a hard disk drive (HDD), a flexible disk (FD), a magnetic tape, or the like. An optical disk may be a digital versatile disc (DVD), a DVD-RAM, a compact disc (CD)-ROM, a CD-recordable (R)/rewritable (RW), or the like. A magneto-optical recording medium may be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When a computer executes this program, it will store the program, which is recorded on a portable record medium or which is transferred from the server computer, in, for example, its storage unit. Then the computer reads the program from its storage unit and performs processes in compliance with the program. The computer may read the program directly from a portable record medium and perform processes in compliance with the program. Furthermore, each time the program is transferred from the server computer connected via a network, the computer may perform processes in order in compliance with the program it receives.

In addition, at least part of the above processing functions may be realized by an electronic circuit such as a digital signal processor (DSP), an application specific integrated circuit (ASIC), or a programmable logic device (PLD).

In the embodiments of the present disclosure a liquid crystal display is taken as an example. However, the embodiments of the present disclosure are also applicable to all flat panel display devices, such as other self light emission display devices and electronic paper display devices including electrophoretic elements or the like. Furthermore, it is a matter of course that the embodiments of the present disclosure are applicable to small-to-medium-sized to large-sized flat panel display devices without special limitations.

Various changes and modifications which fall within the scope of the concept of the present disclosure are conceivable by those skilled in the art and it is understood that these changes and modifications fall within the scope of the present disclosure. For example, those skilled in the art may add components to, delete components from, or make changes in the design of components in each of the above embodiments according to circumstances, or may add processes to, omit processes from, or make changes in conditions in processes in each of the above embodiments according to circumstances. These additions, deletions, changes, and omissions fall within the scope of the present disclosure as long as they include the essentials of the present disclosure.

In addition, of course it is understood that other functions and effects which are obtained by the circumstances described in the embodiments and which are clear from the specification or which are conceivable by those skilled in the art according to circumstances are realized by the present disclosure.

The present disclosure includes the following aspects.

(1) A display device including a light source device includes: a light emission section which emits incident light; a light conversion section which receives the incident light and which converts intensity of the incident light; and a white light conversion section which converts the incident light with the converted intensity to white light.

(2) In the display device according to (1), the light conversion section includes a polymer dispersed liquid crystal layer, and the incident light diffuses in the polymer dispersed liquid crystal layer during passing therethrough.

(3) In the display device according to (1), a main component of the incident light is blue light or ultraviolet-region monochromatic light.

(4) In the display device according to (1), the light conversion section including plural areas converts the intensity of the incident light according to the areas.

(5) In the display device according to (1), white light is emitted from a principal plane of the light conversion section, and the incident light enters the light conversion section from a side with respect to the principal plane.

(6) In the display device according to (4), the light source device further includes a control section which controls the intensity of the incident light according to the areas and emits the light.

(7) In the display device according to (6), the control section controls the intensity of the incident light so as to make intensity of the light equal across the areas.

(8) In the display device according to (7), the control section controls the intensity of the incident light so as to reduce the intensity of the incident light with a decrease in distance from an incident surface.

(9) In the display device according to (7), the control section emits the light only from an area selected from among the plural areas.

(10) In the display device according to (7), light emission intensity of the light emission section which emits the incident light is variable, and the control section controls the light emission intensity to control the intensity of the incident light.

(11) A light source device includes: a light emission section which emits incident light; a light conversion section which receives the incident light and which converts intensity of the incident light; and a white light conversion section which converts the incident light with the converted intensity to white light.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A display device comprising:
   an image display panel including a plurality of pixels; and
   a light source device, the light source device comprising:
   a light emission section which emits monochromatic light;
   a light conversion section which includes a first principal plane, a first opposite plane to the first principal plane, a side with respect to the first principal plane, a plurality of upper electrodes on the first principal plane, a plurality of lower electrodes on the first opposite plane, and polymer dispersed liquid crystal layer portions interspersed with non-scattering portions,
   wherein
   areas of the non-scattering portions increase with an increase in distance from the light source device, and
   the light conversion section receives the monochromatic light as incident light at the side, makes the incident light diffuse in the polymer dispersed liquid crystal layer portions depending on an electric field generated between the upper electrodes and the lower electrodes while the incident light is passing therethrough, converts intensity of the incident light to result in light with a converted intensity, and emits the light with the converted intensity from an entire surface of the first principal plane; and
   a white light conversion section which includes a second principal plane and a second opposite plane to the second principal plane, which receives the light with the converted intensity at the second opposite plane, which converts the light with the converted intensity to white light, and which emits the white light from an entire surface of the second principal plane,
   wherein
   the white light conversion section is a phosphor sheet or a quantum dot sheet, and
   an entire surface of the second opposite plane of the white light conversion section overlaps the entire surface of the first principal plane of the light conversion section.

2. The display device according to claim 1, wherein a main component of the incident light is blue light or ultraviolet-region monochromatic light.

3. The display device according to claim 1, wherein the light conversion section includes plural areas and converts the intensity of the incident light according to the areas.

4. The display device according to claim 3, wherein the light source device further includes a control section which:
controls the intensity of the incident light according to the areas; and
emits the light.

5. The display device according to claim 4, wherein the control section controls the intensity of the incident light so as to make the intensity of the incident light equal across the areas.

6. The display device according to claim 5, wherein the control section controls the intensity of the incident light so as to reduce the intensity of the incident light with a decrease in distance from an incident surface.

7. The display device according to claim 5, wherein the control section emits the light only from an area selected from among the plural areas.

8. The display device according to claim 5, wherein:
light emission intensity of the light emission section which emits the incident light is variable; and
the control section controls the light emission intensity to control the intensity of the incident light.

9. The display device according to claim 1, wherein the white light conversion section is a phosphor sheet, and the phosphor sheet includes a plastic film and phosphor material on the plastic film.

10. The display device according to claim 1, wherein the white light conversion section is a quantum dot sheet.

11. The display device according to claim 1, wherein
the white light conversion section is a phosphor sheet,
the monochromatic light is ultraviolet rays, and
the phosphor sheet includes a plastic film and phosphor materials on the plastic film, the phosphor materials being a green light emitting phosphor material, a red light emitting phosphor material and a blue light emitting phosphor material, or being a yellow light emitting phosphor material and a blue light emitting phosphor material.

* * * * *